March 13, 1962 A. M. NELSON 3,025,056
CARD PROCESSING APPARATUS
Filed Nov. 16, 1959 8 Sheets-Sheet 1

INVENTOR:
Alfred M. Nelson
By Smyth & Roston
Attorneys

INVENTOR:
Alfred M. Nelson

March 13, 1962     A. M. NELSON     3,025,056
CARD PROCESSING APPARATUS

Filed Nov. 16, 1959     8 Sheets-Sheet 4

INVENTOR:
Alfred M. Nelson
By Smyth & Roston
Attorneys

March 13, 1962 A. M. NELSON 3,025,056
CARD PROCESSING APPARATUS
Filed Nov. 16, 1959 8 Sheets-Sheet 5
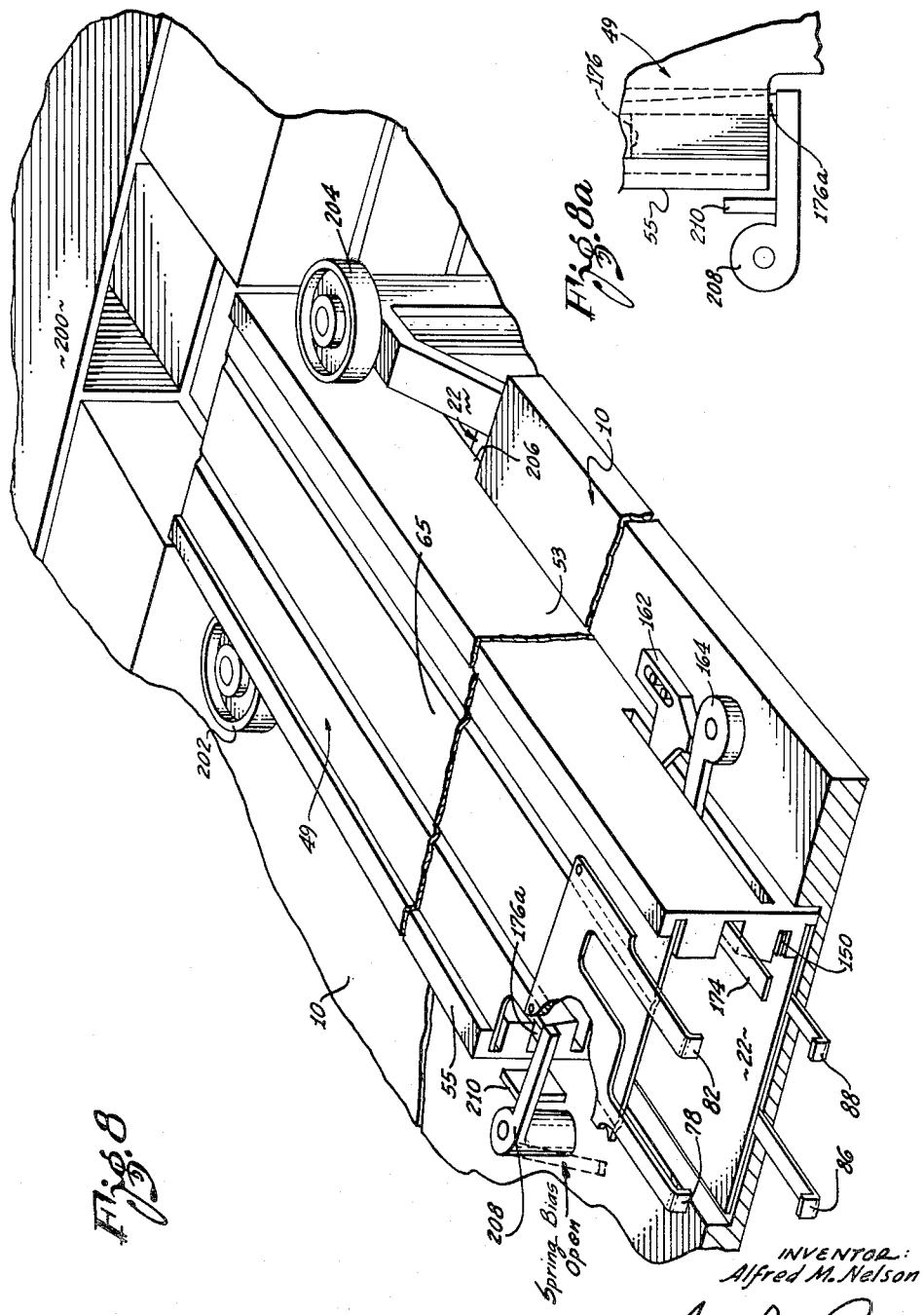
INVENTOR:
Alfred M. Nelson
By Smyth & Roston
Attorneys

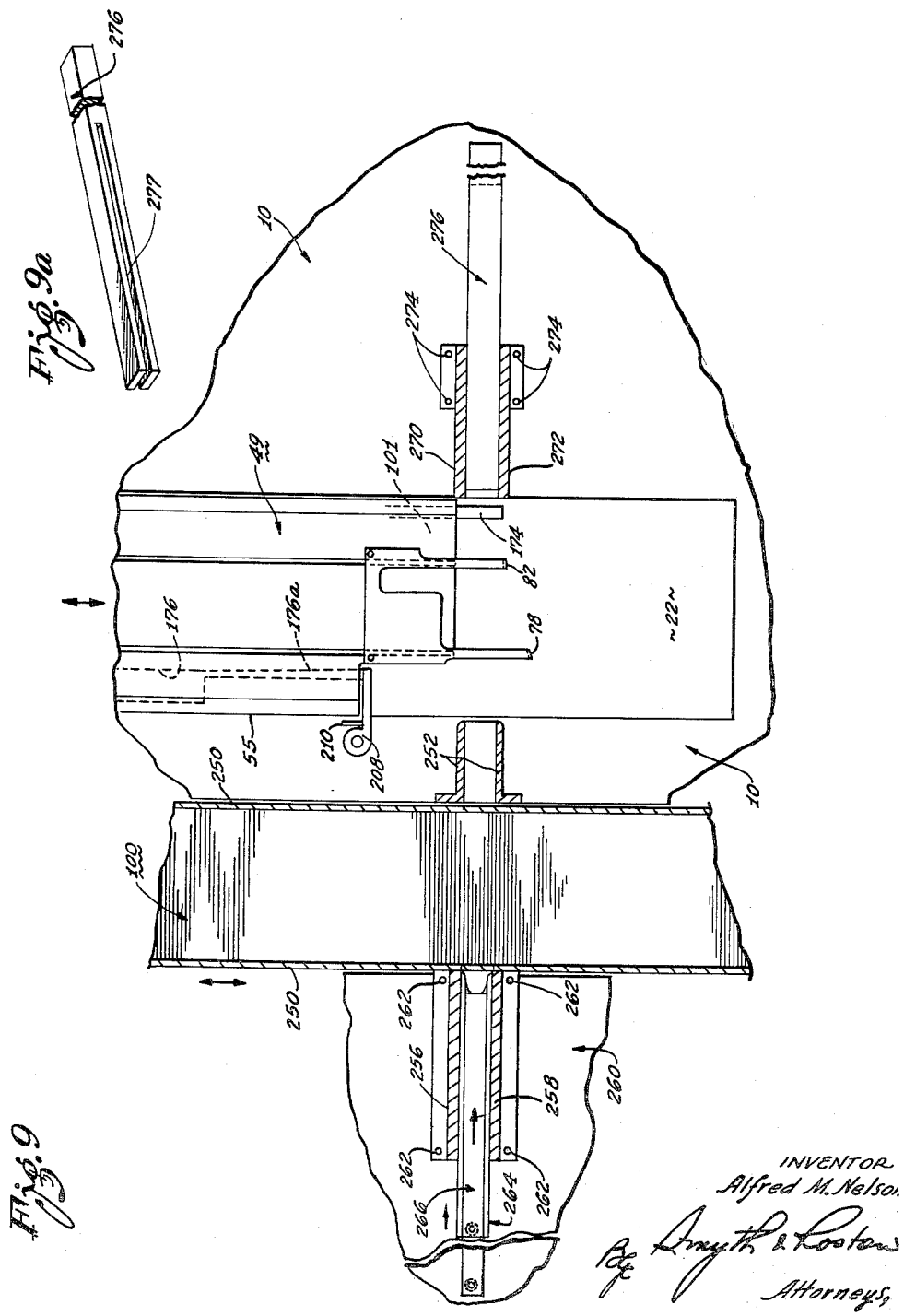

March 13, 1962
A. M. NELSON
3,025,056
CARD PROCESSING APPARATUS
Filed Nov. 16, 1959
8 Sheets-Sheet 7
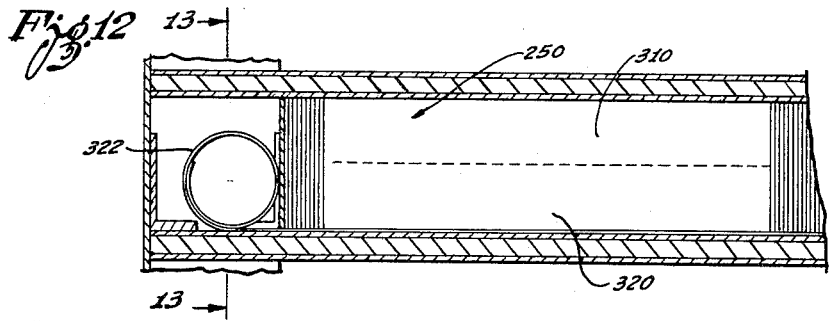
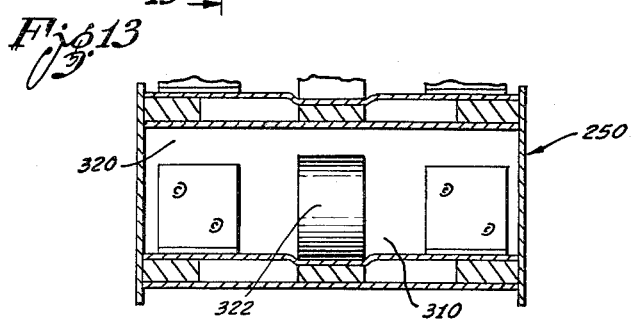
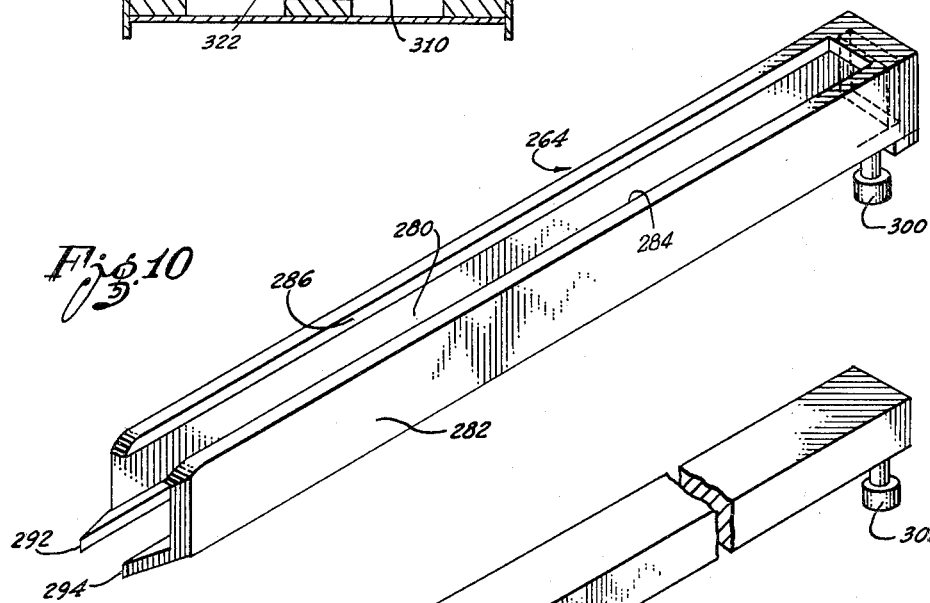
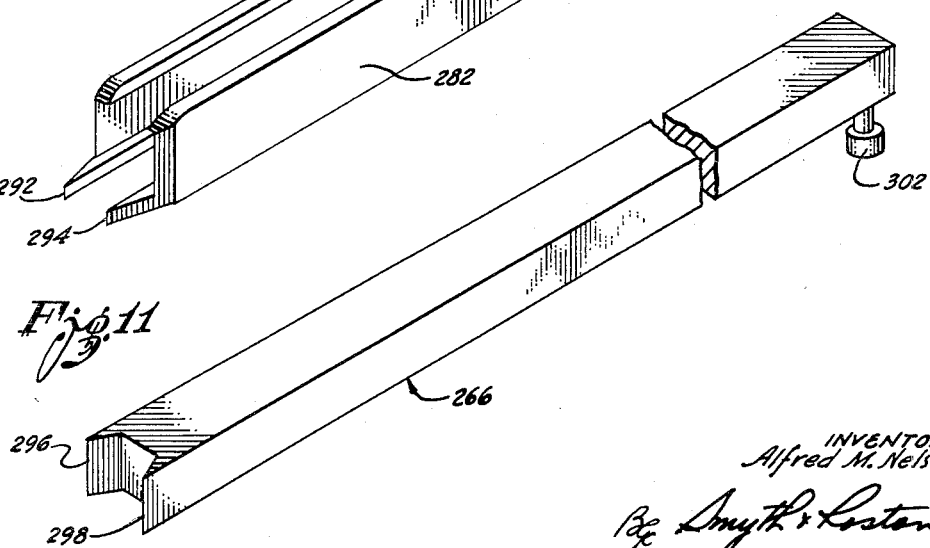
INVENTOR:
Alfred M. Nelson
By Smyth & Roston
Attorneys

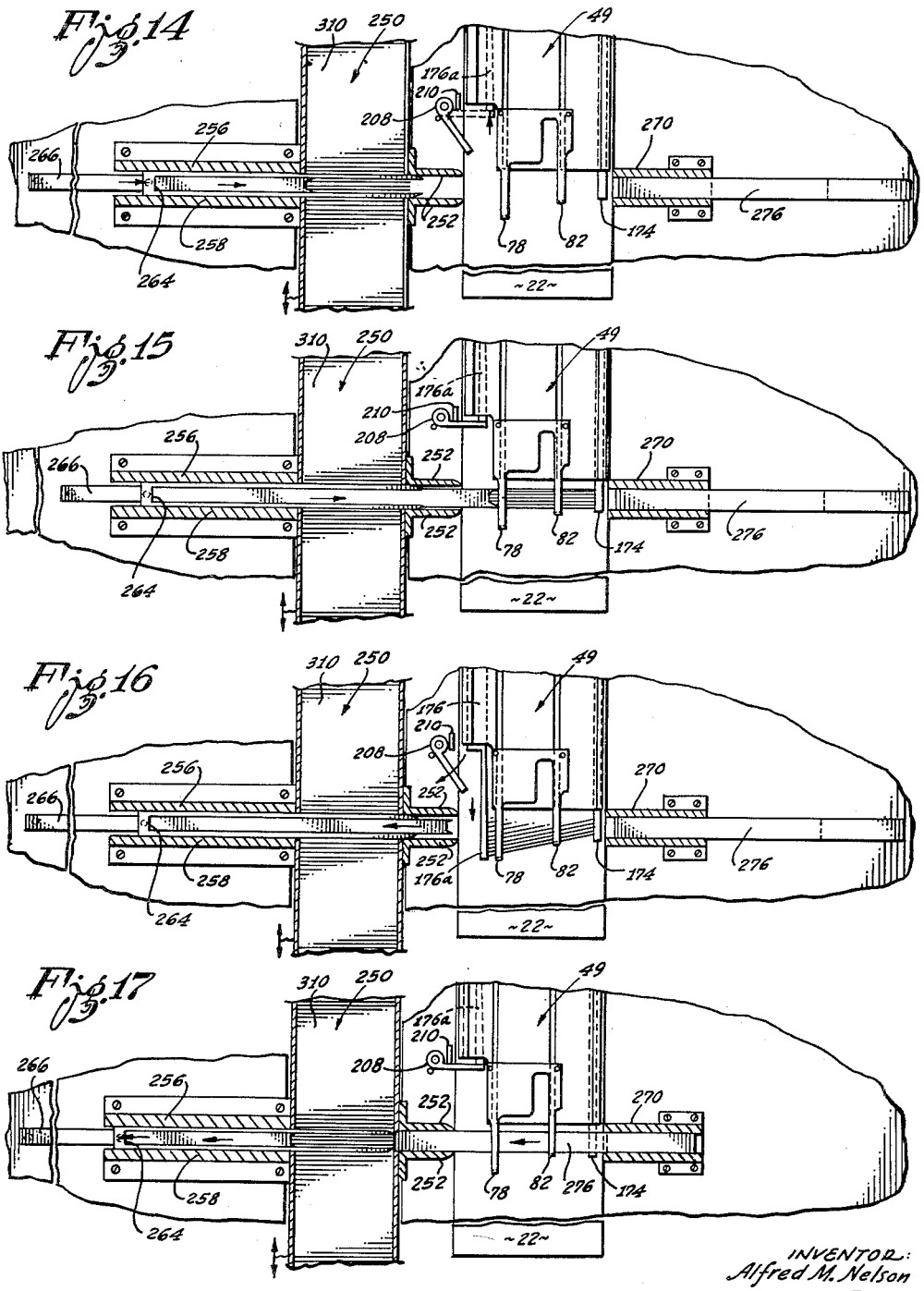

United States Patent Office 3,025,056
Patented Mar. 13, 1962

3,025,056
CARD PROCESSING APPARATUS
Alfred M. Nelson, Redondo Beach, Calif., assignor to The Magnavox Company, Los Angeles, Calif., a corporation of Delaware
Filed Nov. 16, 1959, Ser. No. 853,035
19 Claims. (Cl. 271—61)

The present invention relates to processing apparatus for information storage cards, and it relates more particularly to improved feeding-stacking stations and associated filing equipment for use in such apparatus.

It should be pointed out at the outset that the term "information storage cards" is not intended to be used in a restrictive sense in the following specification and claims. This term is intended generally to cover any of the many discrete elements which are capable of receiving and storing information. Such elements, for example, may include plates, panels, boards and the like.

The feeding-stacking equipment of the present invention is of the type in which the information storage cards are held in each station in a stacked condition within a removable magazine. The magazines themselves may be stored in a suitable file block. The invention is concerned with an improved combination in which further filing means for the cards are included in the equipment, the further filing means being controllable so that selected groups of cards may be controllably moved to and from the further filing means for processing the individual cards in each group.

The feeding-stacking equipment of the invention may be incorporated at each of a plurality of stations in a type of data processing system in which information is stored on a plurality of separate cards, or equivalent discrete elements, in digital or other form. Each of the cards, for example, may be provided with a number of positions and each position may be capable of storing coded binary information. This binary information at the different positions of the cards may typically represent multi-digit numbers or alphanumeric symbols.

The information may be stored on the individual cards for use by the apparatus of the invention in the form of discrete magnetic areas of one polarity or another. Alternately, the information may be stored on the cards in the form of hole patterns, in the form of photographic representations, or in any other appropriate form. For any one of the different forms of recording, it is merely required that appropriate transducers be provided for transforming the information into electric signals, and vice versa.

A large number of information storage cards of the type described above are often required in complex data processing systems. This is because many millions of binary bits are often required to represent the information stored in such systems. The requirement arises, therefore, to provide some means for storing the cards in a manner in which they may be quickly and conveniently selected and fed into the card processing apparatus.

In one type of prior art apparatus, for example, the information storage cards are maintained in a stacked relationship in the feeding-stacking station, and the cards in the station are controllably fed in succession from the station to a suitable card transport medium. The cards are then carried by the transport medium past appropriate transducer heads. These transducer heads read the data on the cards and transform the data into electric signals. Conversely, similar transducer heads receive electrical signals representing data to be recorded on the cards, and these latter heads respond to such signals to record new information on the cards.

Copending application Serial No. 685,539 filed September 23, 1957 in the name of Allan Orner, now U.S. Patent No. 2,901,247, discloses and claims an improved feeding-stacking station of the type under discussion. In the station disclosed in the Orner application referred to above, different groups of the cards are held in a stacked relationship in individual magazines. These magazines may conveniently be stored in a file block, and in accordance with the teachings of the Orner application the magazines may be individually removed from the file block and placed in a feeding-stacking station of the card processing apparatus. Then, a desired card from the selected magazine, or group of cards, may be processed by the card processing apparatus.

The card processing apparatus of the above mentioned copending Orner application Serial No. 685,539 is constructed so that a selected magazine of cards may be quickly snapped into place in a feeding-stacking station. The magazine is then in position to permit the cards to be fed sequentially to the transporting medium. Copending application Serial No. 767,132 filed October 14, 1958 in the name of Alfred M. Nelson et al. is also directed to an improved card processing apparatus in which the movable magazines can be inserted into and withdrawn from the feeding-stacking stations of the apparatus.

Along the same lines, copending application Serial No. 813,913 filed May 18, 1959 in the name of Konstantine W. Harris discloses and claims an improved mechanism in which a structure is provided in each of a plurality of feeding-stacking stations to provide a supporting surface for magazines such as those discussed in the preceding paragraphs, and in which the magazines may be selectively and automatically moved into place on the control surface. In accordance with the teachings of this latter copending application, a file block can be provided at each station. This file block supports a plurality of magazines and is movable up and down transversely of the supporting surface of the station. This file block is controllable to position the magazines selectively in the plane of the supporting surface of the station. Then, and in a manner described in detail in the copending application Serial No. 813,913, a mechanism is controlled to engage the positioned magazine and to draw it from the file block. The withdrawn magazine is then moved along the supporting surface of the station into position so that the cards stacked in it may be sequentially transferred to a transporting medium. The transporting medium then carries the cards in succession past a processing station. After the processing of the cards has been completed, they are returned to the same or another magazine and the magazine may then be returned to the file block. The return of the magazine to the file block is also controlled by the mechanism described in the copending application.

The apparatus and systems described briefly in the preceding paragraphs are of the "end-entry" type, in that, when a magazine is selected and positioned in a feeding-stacking station, the cards stacked in the magazine are fed in succession from one end of the magazine and into the card processing apparatus. This means that the entire group of cards in a selected magazine are usually involved for the different processing operations. For some of these operations, however, in which only one, or a few cards are desired, the searching through all the cards of the entire magazine to find the desired card, or cards, requires excessively long access times under some conditions. These access times could be reduced, for example, if only selected groups of the cards in the magazine were actually involved in the search, a preliminary control operation having been made to select the particular group of cards in which the desired card appears.

Copending application Serial No. 587,055 filed May 24, 1956 discloses card processing apparatus in which a "side-entry" technique is used to reduce the access time in which one or more desired cards can be selected from a magazine. In the apparatus of the latter copending application, a file block containing a plurality of information storage cards is used. The cards may be stacked in the file block, for example, in separate shelves in the block and in separate compartments on each shelf. The file block described in the copending application Serial No. 587,055 is movable, for example, vertically and horizontally to bring different shelves into operative position, and to bring different groups of cards on each shelf into an operative position. Then, when a particular desired group is moved into position, that group may be selected for processing.

In the apparatus described in the copending application Serial No. 587,055, the selected group of cards is moved into position between a pair of transport drums. These transport drums are part of a closed loop which includes four transport drums. The cards in the selected group are then sequentially carried by the four drums for processing, and are returned in succession to a position between the original two drums at the completion of the processing. When all the cards have been so returned, the resulting stack of cards between the original two drums may be returned to its original position in the file block.

The apparatus disclosed in the copending application Serial No. 587,055 is ideally suited for performing a variety of operations on the stored information storage cards and with a minimum of access time in the selection of any card. However, the use of the apparatus described in this application may be limited in some circumstances because the processing apparatus required to process the cards must be peculiarly adapted to the feeding equipment disclosed in that application. This means that the processing apparatus is sometimes not compatible with other types of feeding equipment such as the end-entry type described above, nor is the apparatus disclosed in the copending application Serial No. 578,058 readably adaptable for use in conjunction with a plurality of feeding-stacking stations which are required for many collating or sorting operations.

An important feature of the present invention is the provision of side-entry feeding apparatus which is compatible with the end-entry type, such as described above, and which permits the use of card processing apparatus which is compatible to both. This permits side-entry feeding-stacking stations to be used in conjunction with card processing apparatus that may also be used to advantage with end-entry feeding-stacking stations.

In more basic terms, the concept of the present invention provides for the use of side-entry feeding-stacking equipment to reduce access time, and yet permits such equipment to be used with card processing apparatus which is compatible with other types of card feeding-stacking equipment. Moreover, the side-entry equipment of the present invention may be conveniently used in multiple station apparatus, so that the various sorting operations may be performed on the information storage cards without radically changing the design of the processing apparatus from existing concepts.

More specifically, an important aspect of the present invention is that it permits a group of cards, selected in accordance with side-entry techniques, to be introduced to a feeding-stacking station, which station may also be used to receive magazines in the manner described above for the end-entry feed of the cards. This, as noted, enables card processing apparatus to be used which is compatible to either side-entry or end-entry type of feeding mechanisms, or to both.

Another important feature of the invention, and in another of its aspects, is the provision of a common card processing apparatus in conjunction with one or more feeding-stacking stations, and in which the feeding-stacking stations are constructed to employ end-entry or side-entry mechanisms, or both. In accordance with this latter feature, a first file block may be controllable to bring different magazines into position for insertion into a corresponding one of the feeding-stacking stations for end-entry feeding of the cards into the card processing apparatus. Moreover, a second file block may be controllable in the same station to enable a small selected group of cards from a large stack in a second file block to be inserted into the station by side-entry techniques for subsequent successive feed of the cards in the selected group to the card processing apparatus.

The feature described in the preceding paragraph enables a large number of cards to be stored at each of the feeding-stacking stations, and it also enables a first large group of cards to be individually processed by end-entry feeding and stacking techniques for operations where all the cards in a particular stack are to be examined, and it enables a second smaller group of cards to be selected from a further large group and inserted into the station by side-entry techniques for processing when a few cards only are desired so as to obviate the need for examining a large stack of cards in the search for one or more desired cards.

Another important feature of the particular side-entry feeding-stacking mechanisms of the embodiment of the invention to be described is that the actual insertion of a selected group of cards into a corresponding feeding-stacking station can be carried out on a time-shared basis. That is, this insertion can be carried out while the card processing apparatus is processing cards from another station. This time-shared concept permits a material saving in many instances since all the group selecting and inserting operations can be accomplished while the machine is performing other functions, and therefore without any resulting dead time.

When four feeding-stacking stations are provided, for example, in a typical card processing apparatus, and when each of the stations incorporates a side-entry feeding-stacking mechanism in accordance with the invention, the apparatus may be controlled to process cards fed from a first feeding-stacking station and stacked in a second station, and then to process cards fed from a third station and stacked in a fourth station. Then, when the cards from the first station are being processed, a selected group may be inserted in the third station for the next processing operation and so on.

In the drawings:

FIGURE 1 is a top plan view of processing apparatus for information storage cards, which apparatus is constructed in accordance with the concepts of the present invention; this view illustrating a group of vacuum pressure rotatable transport drums for the cards and a corresponding group of feeding-stacking stations respectively associated with the different drums, each of the illustrated feeding-stacking stations being constructed to utilize end-entry magazines and side-entry file structures which operate in combination to achieve the desired results of the present invention;

FIGURE 2 is a top fragmentary plan view of a portion of the apparatus of FIGURE 1 on an enlarged scale and illustrating certain components of the apparatus which were omitted from the representation of FIGURE 1 for purposes of clarity, the view of FIGURE 2 illustrating, for example, suitable gate transfer mechanisms for controlling the transfer of cards from one drum to another, suitable transducer means for processing the cards, and suitable feed heads for controlling the feed of the cards from the feeding-stacking stations to the transport drums;

FIGURE 3 is a fragmentary top plan view, partly in section, and on an enlarged scale with respect to FIGURE 1, this latter view illustrating an end-entry magazine in place in one of the feeding-stacking stations of FIGURE 1, and the sectional view illustrating the manner in which a pair of actuators cooperate with one another and with a card-retaining locking bar in the magazine to cause the locking bar to be moved to a disengaged position when the magazine is moved into place in the station;

FIGURE 4 is a perspective view of the end-entry magazine referred to above; this latter view illustrating particularly the magazine positioned in one of the feeding-stacking stations of FIGURE 1, the different components of the magazine which are used for retaining the cards in the magazine, and certain components in the feeding-stacking station which engage corresponding elements of the magazine assembly;

FIGURE 5 is a front elevational view of the magazine of FIGURE 4, this latter view illustrating particularly the details of the removable magazine, and certain slide members which are positioned in the magazine for card retaining purposes;

FIGURE 6 is a sectional view of the magazine of FIGURE 4, substantially on the line 6—6 of FIGURE 4, this sectional view also showing details of the magazine, a card follower being illustrated in the sectional view and which unit is positioned in the magazine for biasing a stack of information cards normally held in the magazine towards the mouth of the magazine and against the rim of the corresponding transport drum associated with the magazine;

FIGURE 7 is a top view of the card follower shown in elevation in FIGURE 3 and of the components which make up the card follower; this view also showing a guide member which engages a slot in one of the walls of the magazine to permit the card follower to move back and forth in the magazine, and also showing the locking bar which is controlled in a manner to be described to arrest the card follower unit in the magazine when the magazine is removed from the station;

FIGURE 8 is a perspective view of a magazine positioned in one of the feeding-stacking stations, this view also showing a pair of rotatable discs which are controlled to selectively engage the sides of the magazine to cause it to be moved in and out of the station, and in and out of an associated file block;

FIGURE 8a is a fragmentary top plan view of a forward corner of the magazine of FIGURE 8, and of the engagement of one of the slide members of the magazine with a spring-biased restraining arm;

Figure 1:
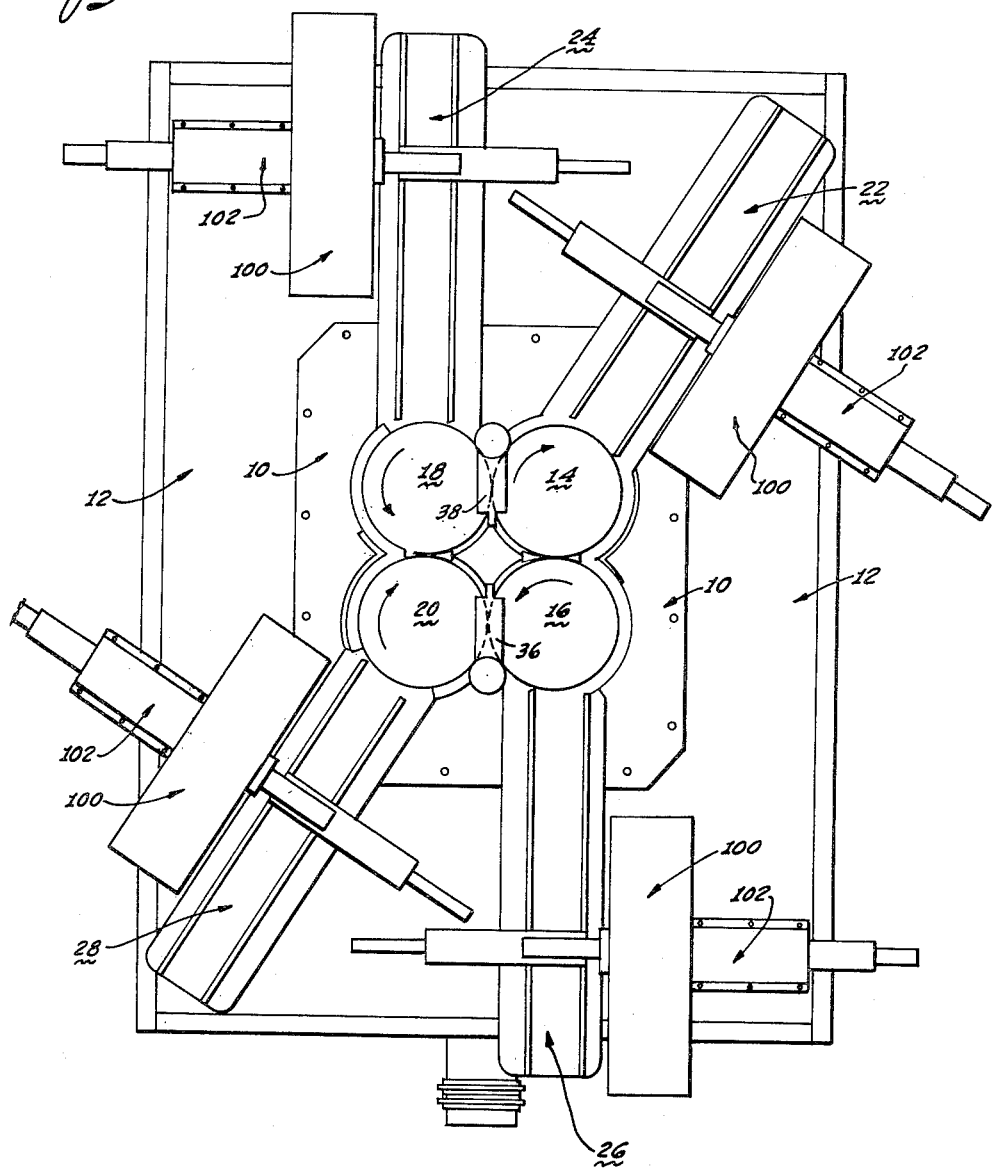

FIGURE 9 is a top plan view on an enlarged scale with respect to FIGURE 1 and partly in section, this latter view illustrating a portion of one of the feeding-stacking stations of FIGURE 1 and illustrating the manner in which a side-entry file mechanism cooperates with an end-entry magazine, such as the magazine mentioned above, to introduce a selected group of cards into the magazine while the latter is positioned in its corresponding feeding-stacking station;

FIGURE 9a is a perspective view of a push rod which is included in the side-entry mechanism;

FIGURE 10 is an enlarged perspective view of a movable spreader which is used for separating a selected group of cards from the other cards in the file block so that the selected group of cards can be subsequently removed from the file and advanced into the magazine;

FIGURE 11 is an enlarged perspective view of a push rod which is movable to advance the cards in the group selected by the spreader of FIGURE 10 toward the magazine after the cards have been isolated in the file block by the spreader;

FIGURE 12 is an enlarged fragmentary sectional view in illustration of a portion of the file used for stacking the cards, as seen from a position to the rear of the file;

FIGURE 13 is an enlarged fragmentary sectional view substantially on the line 13—13 of FIGURE 12 and illustrating the construction of certain features of the file, and particularly showing the construction of a biasing member which retains the cards in a stacked relationship in the file;

FIGURE 14 is an enlarged fragmentary top plan view, partly in section, of a magazine in one of the feeding-stacking stations of the invention, and also showing the side-entry file associated with that station and different members cooperating with the side-entry file to select a particular group of cards from the file, this view illustrating the disposition of such selecting members when the cards in a particular group are being selected from the file;

FIGURE 15 is an enlarged fragmentary top plan view of the selecting members shown in FIGURE 14, and illustrating the disposition of the selecting members and the cards of the selected group after the cards have been advanced and inserted into the magazine;

FIGURE 16 is an enlarged fragmentary top plan view of the selecting members shown in FIGURE 14, and this latter view illustrates the disposition of the selecting members and of the cards in the particular group after such cards have been circulated and returned to the magazine; and FIGURE 17 is an enlarged fragmentary top plan view of the selecting members illustrated in FIGURE 14, and this view illustrates the disposition of the selecting members and of the cards in the selected group after the cards have been returned to their original position in the file.

The card processing apparatus of FIGURE 1 may be positioned on a table top 10 which, in turn, is supported by an appropriate supporting surface 12 to lie in a horizontal plane. A group of four rotatable vacuum pressure transport drums are rotatably mounted on the table top 10. These drums are designated 14, 16, 18 and 20 respectively, and they are positioned in the illustrated adjacent relationship on the table top.

The rotatable vacuum pressure transport drums may be constructed in the manner disclosed in Patent 2,883,189. Each of these drums, for example, has a hollow interior and each has a plurality of axially spaced slots extending around its peripheral surface. A vacuum pressure is established in the interior of the drum, and this creates a vacuum force at its peripheral edge. The vacuum force created at the peripheral edge of each drum serves to retain the cards firmly on that surface, so that the drums may transfer the cards from one point to another. As noted, the details of such drums are fully described in Patent 2,883,189. It should be pointed out, however, that any other suitable movable or stationary transport means may be used for causing the cards to be moved from one station to another in the card processing apparatus. For example, stationary means such as disclosed in copending application Serial No. 731,143 filed April 28, 1958 in the name of Eric Azari, now U.S. Patent No. 2,940,928, may also be used.

In the apparatus illustrated in FIGURE 1, the rotatable vacuum pressure transport drums 14 and 20 are driven in a clockwise direction, and the drums 16 and 18 are driven in a counter-clockwise direction. As will be described in conjunction with FIGURE 2, a suitable mechanical transfer gate may be placed between the drums 16 and 14, so that cards carried to the gate by the drum 16 may be transferred to the drum 14. A similar mechanical transfer gate may be positioned between the drum 18 and the drum 20, so that cards carried to the latter gate by the drum 18 may be transferred to the drum 20.

A plurality of card feeding-stacking stations 22, 24, 26 and 28 are mounted on the table top 10, and these stations are positioned to have their mouths disposed adjacent respective ones of the transport drums 14, 18, 16 and 20. Each of the feeding-stacking stations is constructed, like the station 22, to receive a magazine which may contain a stack of information storage cards. Such magazines, as will be described, are supported in an appropriate file block at the rear of the corresponding station. A suitable mechanism is actuable, as will be described, to cause a selected magazine to be brought from the file block into position in the station. This mechanism is also actuable subsequently to return the magazine from the station to the file block.

The magazine referred to above is of the end-entry type. This magazine is moved radially forward in the corresponding station to an operating position in which the mouth of the magazine faces the corresponding one of the drums 14, 18, 16 and 20. When the magazine is in position in the station, transfer mechanisms which will be described, are operated to control the transfer of cards in sequence out of the positioned magazine and onto the periphery of its corresponding transport drum. Moreover, the transfer mechanisms are controllable to return cards individually from the corresponding transport drum into the same or a different magazine upon the completion of processing of such cards. Then, the magazine is returned into the file block to complete the processing operation.

In accordance with the present invention, a file 100 is positioned adjacent the station 22 in the illustrated position in FIGURE 1, and similar files are positioned adjacent respective ones of the stations 24, 26 and 28. The file 100, as will be described in detail, is of the side-entry type. This file is controllable in vertical and horizontal directions so that a selected group of cards in the file may be brought into position for insertion into the corresponding station. A suitable insertion mechanism is illustrated as 102 in FIGURE 1, and this mechanism will be described in more detail subsequently.

In accordance with the concepts of the embodiment of the invention illustrated herein, a selected magazine is removed from the file block at the rear of the station 22, and the selected magazine is moved into the station to an intermediate position in the station to receive a selected group of cards from the side-entry file 100. The selected group of cards is inserted from the side-entry file into the magazine by the insertion mechanism 102. The magazine, having received the selected group of cards from the side-entry file 100, is now moved forwardly into position in the feeding-stacking station adjacent the drum 14. The cards in the magazine may then be processed in the same manner as other cards from similar magazines.

As noted above, the incorporation of the side-entry file 100, and its insertion mechanism 102, in the station 22 permits a large number of cards to be stored at each station. Moreover, individual cards from the large number are readily accessible at a low access time, this being due to the group selection capabilities of the mechanism 102.

The mechanism 102, as will be described, is capable of selecting any desired group of cards from the file 100. This means that only the cards in the selected group need be processed in a search for a desired card, and it obviates the necessity of searching through an entire magazine of cards in order to reach desired information.

Moreover, the cards from the side-entry file 100 may, in accordance with the present invention, be processed in the same type of equipment which has universal application to cards received from the end-entry magazines positioned into the station 22 in the manner described briefly above, and as will be described in more detail subsequently.

As noted above, similar side-entry files 100 may also be mounted adjacent the stations 24, 28 and 26. These latter side-entry files, together with corresponding selection mechanisms, operate in the same manner as the side-entry file and equipment associated with the station 22. As also noted, the stations 24, 28 and 26 may also have appropriate file blocks for end-entry magazines positioned adjacent their respective rear ends, and such file blocks may be controllable to enable selected end-entry magazines to be moved into the different stations.

It follows, therefore, that a magazine in the file block containing a particular group of cards may be selected from the file block and moved into position in the corresponding one of the feeding-stacking stations 22, 24, 28 and 26, so that the particular group of cards may be processed. Conversely, an empty magazine may be moved from the file block into the corresponding station to receive a selected group of cards from the associated side-entry file, such as the file 100. In either event, when the magazine is in place in the particular feeding-stacking stations, the station may be conditioned to a feeding mode in which the cards held in stacked relationship in the magazine may be controllably and sequentially fed to the corresponding transport drum.

Each of the feeding-stacking stations also has a stacking mode of operation, however, in which cards carried to its mouth by the corresponding transport drum may be sequentially deposited into a poistioned magazine in the station. At the completion of this latter operation, the positioned magazine may be returned to its file block, or returned to an intermediate position in the stations to enable the cards in the magazine to be returned as a group to the corresponding side-entry file, such as the file 100.

A controllable gate transfer mechanism 36 is illustrated in FIGURE 1 as being positioned between the drums 16 and 20, and a similar controllable gate transfer mechanism 38 is illustrated in FIGURE 1 as being positioned between the drums 14 and 18. Each of these gate transfer mechanisms may be constructed in accordance with the present invention. As will be described, the gate transfer mechanisms can be controlled selectively to transfer cards between their adjacent drums, and from either one of the two adjacent drums to the other.

The apparatus of FIGURE 1 is capable of performing a large number of processing and handling operations on the information storage cards from the different feeding-stacking stations 22, 24, 26 and 28. This apparatus is similar, for example, to apparatus described in copending application Serial No. 737,439 which was filed May 23, 1958. Suitable transducers may be positioned adjacent the respective drums, and appropriate logical control circuitry may be coupled to the transducers. This logical control circuitry is capable of controlling the apparatus of FIGURE 1 so that the cards in the different stations may be merged, collated, sorted, or otherwise processed; or so that any desired one or more of the cards in any of the stations may be selected for processing.

Figure 2:
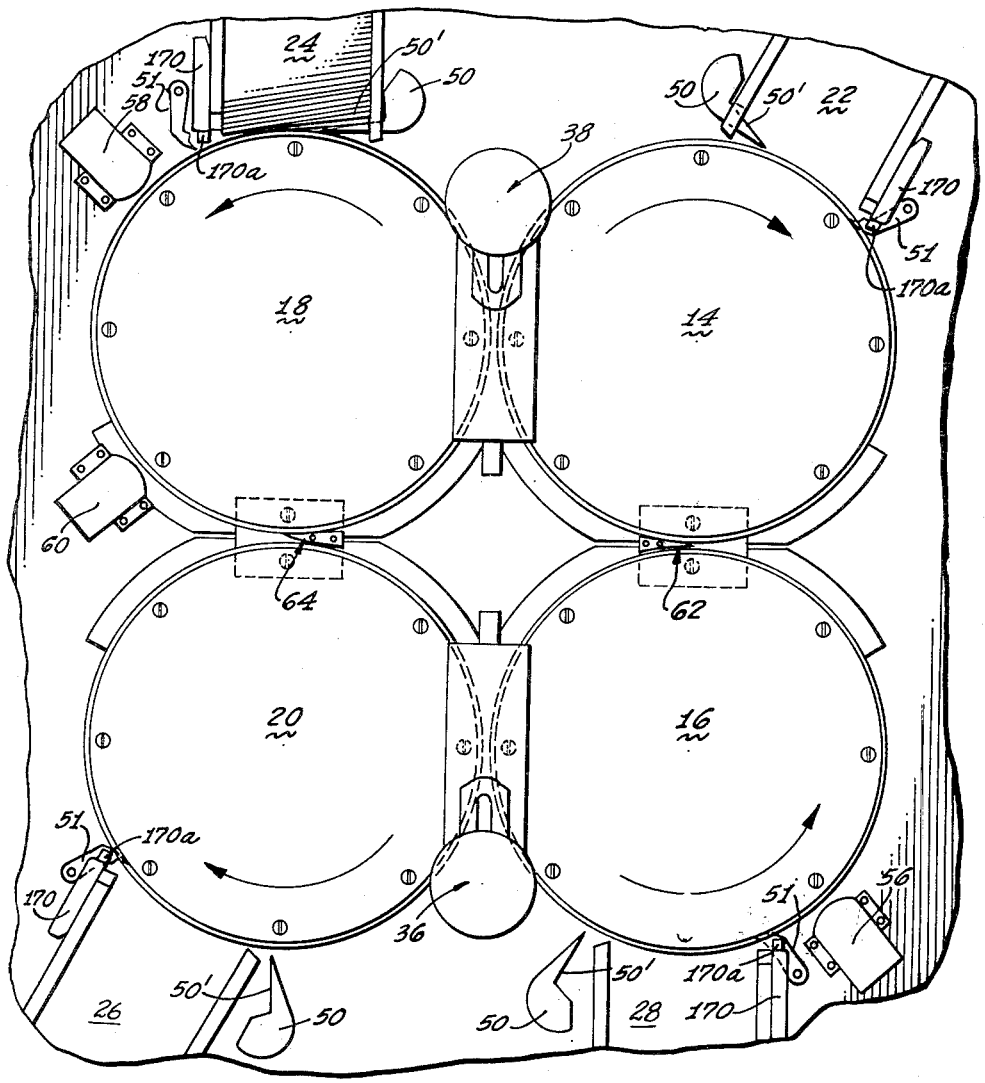

The apparatus illustrated in FIGURE 1 is intended to show a typical unit in which the feeding-stacking stations of the invention may be incorporated. The enlarged view of FIGURE 2 illustrates, as mentioned above, various components which may be associated with the drums 14, 16, 18 and 20 to perform desired handling operations on the cards. The feeding-stacking station 22, for example, includes a feed head 50 which is positioned adjacent the leading wall of the station, with respect to the rotation of its corresponding transport drum 14. The station 22 also includes a stack head 51 which is positioned adjacent the trailing wall of the station.

The feed head 50, as fully described in copending application Serial No. 645,639 filed March 12, 1957, now U.S. Patent No. 2,969,979, is movable between a stand-by position and an operative position. When the feed head 50 is in its operative position, the feeding-stacking station 22 is conditioned to its feeding mode. An elongated member 170, as will be described in more detail, is positioned adjacent the trailing edge of the feeding-stacking station 22. The member 170 has a tongue portion 170a at its leading edge, and the tongue portion extends into close proximity with the periphery of the vacuum transport drum 14. The tongue 170a defines a feed throat with the periphery of the drum 14. The width of the feed throat is such that one card only can pass at a time through it from the station 22 to the periphery of the drum.

A vacuum pressure is controllably established at the surface 50′ of the feed head 50 when the feed head is in its operative position. This vacuum pressure serves to hold the leading card in the station 22, and the leading card holds the other cards back in the magazine positioned in the station. However, when the vacuum pressure at the surface 50' of the feed head 50 is interrupted, one or more of the cards can then pass in succession from the station to the periphery of the drum 14 through the feed throat formed by the tongue 170a.

When the feed head 50 is moved to its operative position to condition the feeding-stacking station 22 to its feeding mode, as described in the preceding paragraphs, the stack head 50 is moved back to a stand-by position. When the station is conditioned to a stacking mode, however, the stack head 51 is moved to an operative position in which it closes the feed throat formed by the tongue 170a, and the feed head is retracted to a stand-by position. In the stacking mode of the station, cards carried to its mouth by the drum 14 are arrested by the stack head 51 and deposited in the station.

The other feeding-stacking stations 24, 26 and 28 may have similar feed heads associated with them, and they may also have corresponding elongated members, similar to the member 170, having tongues 170a which define respective feed throats with their associated transport drums. The feed heads at the different feeding-stacking stations may be moved between their respective stand-by and operative positions under the control of the logic circuitry referred to above, and the vacuum pressure at the different feed heads can be selectively interrupted under the control of a logical circuitry so that the apparatus may perform a desired card handling operation. The desired controls may be initiated, for example, by transducer means 56 which is positioned adjacent the transport drum 16, and by transducer means 58 and 60 which are positioned adjacent the transport drum 18. These transducer means may each comprise one or more transducer heads which are positioned to sense and/or write different rows of data on the information storage cards carried past them by the respective transport drums 14, 16, 18 and 20. The transducer heads may, for example, comprise suitable electromagnetic read and/or write heads, when information storage cards having magnetic recordings are being processed.

The transducer means 56 serves to process the information storage cards fed from the feeding-stacking station 26 onto the periphery of the transport drum 16. As a result of such processing, various decisions may be made as to whether such cards are to be stacked in the feeding-stacking station 22, or whether the cards are to be transferred to the drum 18 for stacking in the feeding-stacking station 24 or for further processing by the transducers 58 and 60. Such further processing may lead to a subsequent stacking in the feeding-stacking station 28, or to a return of the cards to the feeding-stacking station 26. Likewise, cards positioned in the feeding-stacking station 24, and fed from that station to the transport drum 18, are processed by the transducer means 58 and 60 so that decisions concerning those cards may be made.

Mechanical card transfer gates 62 and 64 are positioned between the drums 16 and 14, 18 and 20, respectively, as mentioned above. These gates may be of the type described in copending application Serial No. 818,830 filed July 8, 1959, in the name of Alfred E. Gray et al. The gate 62 is mounted on the table top 10 in position so that it may transfer any card carried to it by the transport drum 14. In like manner, the transfer gate 64 is mounted on the table top 10 in position to transfer any card carried to it by the transport drum 18, from the drum 18 to the peripheral surface of the transport drum 20.

Controllable gate transfer mechanisms, such as the gate transfer mechanisms 36 and 38 are also described in copending application Serial No. 818,830. These latter gate transfer mechanisms may be of the pneumatic type described in that application.

The gate transfer mechanism 36, for example, is controllable to emit streams of pressurized fluid (such as compressed air) tangentially of the drum 16. These streams serve to strip any card brought under their influence by the drum 16 from the periphery of that drum, and to transfer such cards from the drum 16 to the drum 20. The gate transfer mechanism 36 is also controllable to emit streams of pressurized fluid (such as compressed air) tangentially of the drum 20 to effect the controllable transfer of information storage cards from the drum 20 to the drum 16. In like manner, the gate transfer mechanism 38 is controllable to effectuate the controlled transfer of information storage cards from the transport drum 14 to the transport drum 18, and this latter gate transfer mechanism is independently controllable to effect the transfer of cards from the transport drum 18 to the transport drum 14.

Figure 3:
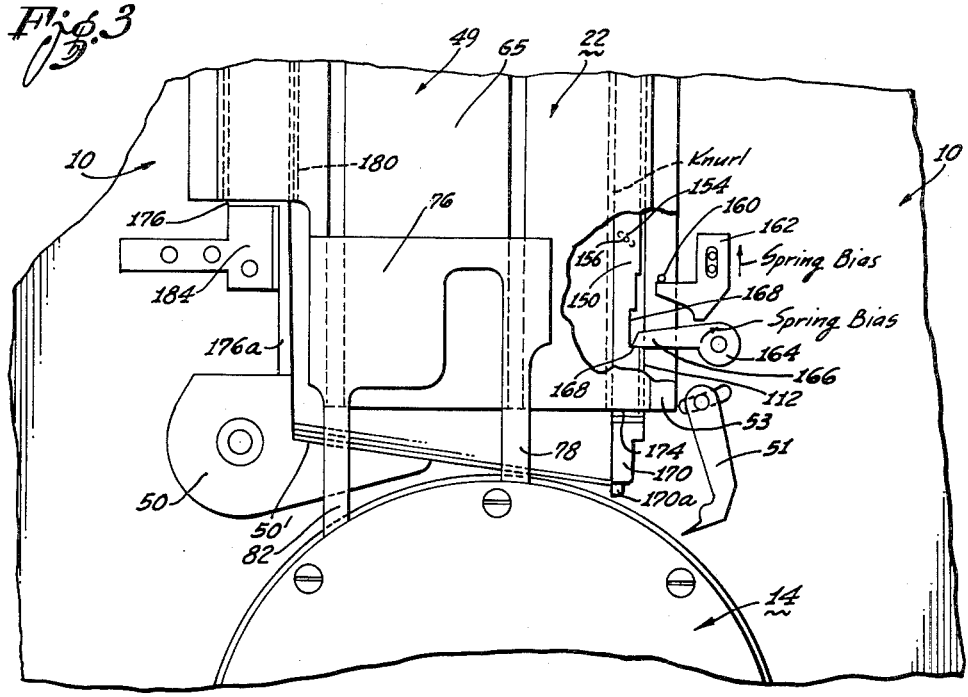

The fragmentary top plan view of FIGURE 3 shows a magazine 49, selected in the manner described above, and brought into position in the feeding-stacking station 22. This fragmentary view also shows the feeding-stacking station 22 with its feed head 50 moved to an operative position and with its stack head 51 at a stand-by position. In the illustrated operating mode of the station 22, the cards held in a stacked condition in the positioned magazine may be sequentially fed to the periphery of the transport drum 14 through the feed throat formed by the tongue 170a and under the control of the vacuum pressure at the face 50' of the feed head 50. Further details of the magazine in position in the feeding-stacking station 22 are shown in the perspective view of FIGURE 4.

Figure 4:
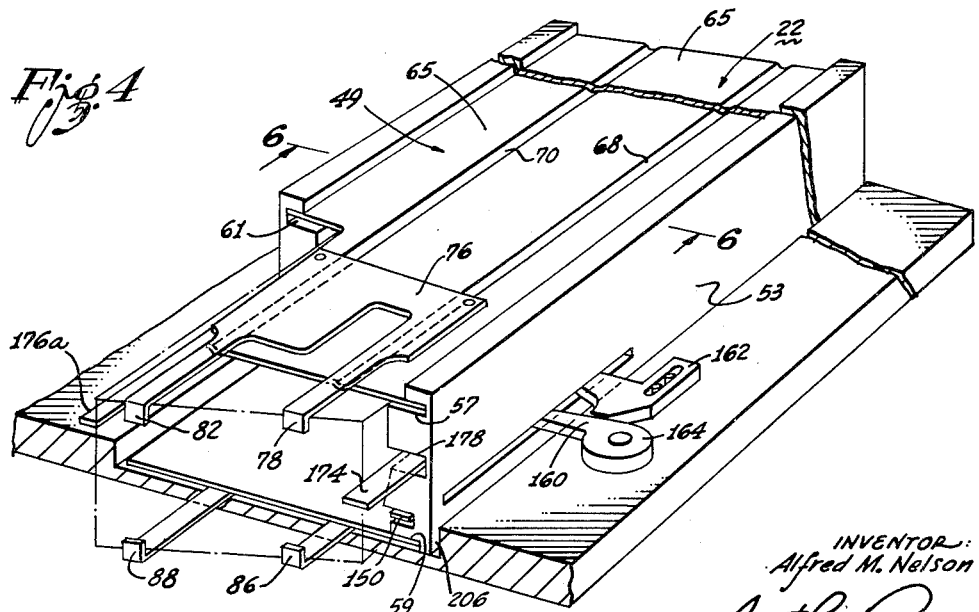
Figure 5:
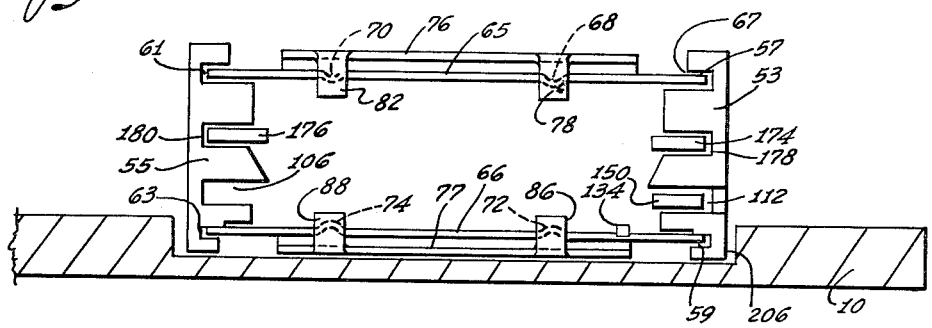

As illustrated in FIGURES 4 and 5, the table top 10 is provided with a groove at the station 22 for receiving the magizine 49. This magazine, as mentioned above, and as will be described in detail subsequently, is selected from an appropriate file block at the rear of the station 22. The magazine may contain a previously-loaded stack of information storage cards for processing, or it may contain a selected group of cards which were received from the side-entry file 100, as described briefly in conjunction with FIGURE 1.

The magazine 49, as shown in FIGURES 3, 4, 5 and 6, may have a rectangular configuration, and it includes a pair of side walls 53 and 55. The inner surface of the side wall 53 is provided with an upper slot 57 and a lower slot 59. These slots extend lengthwise along the entire inner surface of the side wall 53. In like manner, the inner surface of the side wall 55 is povided with a slot 61 which is aligned with the slot 57 in the side wall 53. The slot 61 extends along the entire inner surface of the side wall 55. A lower slot 63 is also formed in the inner surface of the side wall 55, and the latter slot is aligned with the slot 59 in the side wall 53. The slot 63 also extends along the entire inner surface of the wall 55.

A top panel 65 is inserted in the slots 57 and 61, and this top panel is attached to the side walls 53 and 55 by welding, or by any other appropriate means. Likewise, a lower panel 66 extends into the slots 59 and 63, and the lower panel is attached to the side walls by welding, or by any other appropriate means. The panels 65 and 66 form the top and bttom of the magazine 49 respectively. These panels, together with the side walls 53 and 55 cooperate to form an enclosure with an open mouth at its forward end.

The construction of the magazine described above, and the additional components which are incorporated in the magazine, and which will be described, are similar to those disclosed and claimed in copending application Serial No. 823,690 filed June 29, 1959 in the name of Herman J. Malin et al. (now U.S. Patent No. 2,977,113); and in copending application Serial No. 829,430 filed July 24, 1959 in the name of Allan Orner.

A pair of ribs 68 and 70 are formed on the inner surface of the upper panel 65, and these ribs extend in parallel relationship lengthwise along the panel. A similar pair of ribs 72 and 74 are formed on the inner surface of the lower panel 66, and these latter ribs extend in parallel relationship along the entire length of the lower panel. The ribs 68 and 70 are spaced and parallel to one another in the plane of the upper panel 65, and the ribs 72 and 74 are spaced and parallel to one another in the plane of the lower panel 66. The ribs 68 and 72 are axially aligned with one another, as are the ribs 70 and 74. These ribs engage the edges of the information storage cards which are held in the magazine, and they form supporting rails for the cards as the cards are moved back and forth in the magazine.

An upper bracket 76 is affixed to the top panel 65 of the magazine 49 by welding, or other appropriate means. The bracket 76 has a pair of finger elements 78 and 82 which extend out from the mouth of the magazine and over the upper peripheral surface of the drum 14 (FIGURE 3). These finger-like elements 78 and 82 have downwardly-extending bent-over end portions which extend over the top edges of the cards transported by the drum to the mouth of the station. A similar bracket 77 is mounted to the underside of the lower panel 66, and the latter bracket has a pair of finger-like elements 86 and 88 which extend outwardly from the mouth of the magazine and under the rim of the transport drum 14. The fingers 86 and 88 have bent-over ends which extend up over the lower edges of the cards transported by the drum 14 to the mouth of the magazine.

The finger-like elements 78, 82, 86 and 88 permit the mouth of the magazine itself to be spaced back from the peripheral surface of the drum 14, so that the feed head 50 and the stack head 51 (FIGURE 3) may be moved between their operative and stand-by positions without interference by the side walls of the magazine. The finger-like elements extend out over the cards which are disposed in the space between the mouth of the magazine and the periphery of the drum 14, as such cards are successively fed from the magazine in sequence to the periphery of the drum during a feeding mode of operation; or when such cards are fed from the periphery of the drum into the magazine during a stacking mode of operation.

Then, when it is desired to withdraw the magazine from the station, the bent-over portions of the finger-like elements 78, 82, 86 and 88 engage the card actually on the periphery of the drum 14. These elements then serve to draw that card and the cards in the space between the mouth of the magazine and the periphery of the drum, away from the drum as the magazine is withdrawn towards the rear of the station. The bent-over finger-like elements, and certain sliding elements, which will be described, cage the cards at the forward end of the magazine as it is withdrawn from the station. These elements firmly retain the cards in the magazine so as to prevent the cards from falling out of the magazine.

Figure 6:
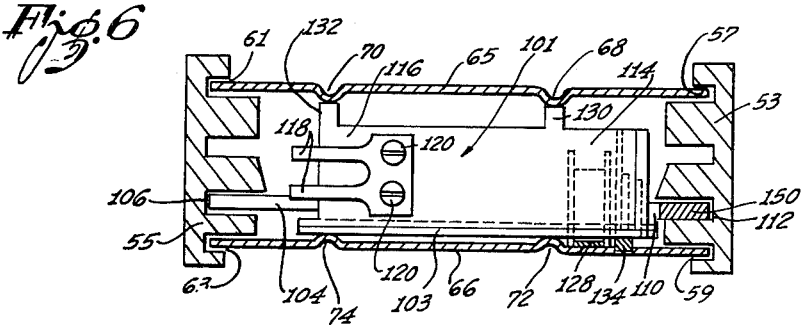
Figure 7:
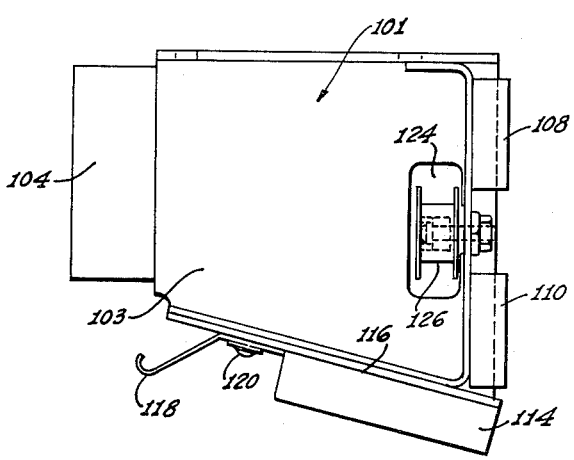

A card follower 101, as shown in FIGURES 6 and 7, is positioned in the magazine 49 for longitudinal movement along the ribs 68, 70, 72 and 74 towards the mouth of the magazine and back away from the mouth. The card follower 101 may be constructed in the manner described in copending application Serial No. 717,270 filed February 24, 1958 in the name of Eric Azari et al., now U.S. Patent No. 2,947,538. The card follower is spring biased towards the mouth of the magazine, and its function is to maintain the cards in a stacked condition in the magazine and to urge the cards against the peripheral surface of the transport drum 14 when the magazine is in place in the station. Then, as the cards are sequentially fed to the periphery of the drum, the card follower 101 moves forward in the magazine by its spring biasing pressure to maintain the cards in a stacked condition. Conversely, when the cards are stacked from the drum 14 into the magazine during a stacking mode of operation, the card follower 101 moves back against its spring biasing pressure. During both modes of operation, however, the card follower is firmly urged by its spring biasing pressure against the rear of the stack of cards in the magazine to maintain those cards in a stacked condition.

The card follower 101 includes a flat bottom panel 103 (FIGURES 6 and 7) which may have a plate of lubricating substance, such as Teflon, secured to its lower surface and which engages the ribs 72 and 74. A first guide strip 104 is secured to one side of the bottom panel 103, and this guide strip extends into a slot 106 which is formed on the inner surface of the side wall 55. The slot 106 extends for the length of the side wall 55, and it serves as a guide for a card follower 100.

The bottom panel 103 of the card follower also has a pair of elongated members 108 and 110 secured to its opposite edge. These latter elongated members serve as guide strips and are disposed adjacent a slot 112 which is formed in the inner surface of the side wall 53. The latter slot extends lengthwise along the entire length of the inner surface of the side wall 53.

A resilient pad 114 formed, for example, of sponge rubber or similar substance, is secured to an upstanding bracket 116 at the front of the follower 101. As illustrated in FIGURE 4, the bracket 116 and the member 114 are inclined when viewed in plan. This is so that the cards may be brought into a proper position to be fed to the periphery of the drum 14 by the feed head 50, when the station is conditioned to its feeding mode.

A pair of electric switching contacts 118 are fastened to the bracket 116 by a pair of screws 120. These contacts are short-circuited with one another, and they serve to engage a pair of further electric switching contacts on the face 50′ of the feed head 50 when the last card is fed out of the station 22. This completes an appropriate electric circuit; and under the control of suitable logical circuitry, certain desired controls may be initiated after the station is empty. For example, when the station is empty, it is desirable to change its mode of operation from the feeding mode to the stacking mode, so that cards now in a second station, may be fed from that station and returned to the feeding-stacking station 22.

The bottom panel 103 of the card follower 100 has a slot 124 formed in it adjacent the guide strips 108 and 110. A bearing 126 is rotatably mounted on an appropriate bracket to be disposed over the slot 124. A resilient spring strip 128 is secured to the panel 66 at its forward end, and this spring strip has a tendency to curl up on itself around the rotatable bearing 126. This action of the spring strip 128, and of the bearing 126, causes the card follower to be biased forwardly towards the mouth of the magazine, for the reasons described above.

The upwardly extending bracket 116 includes a pair of upwardly extending portions 130 and 132 (FIGURE 6). These portions 130 and 132 respectively engage the ribs 68 and 70 in the top panel 65. A guide rail 134 is mounted in the lower panel 66, and this guide rail extends along the length of the magazine. The guide rail 134 is received by a slot formed in the bottom of the panel 102 of the card follower 101. The card follower 101 is supported in this manner for longitudinal movement in the magazine toward and from the mouth of the magazine. As mentioned above, the spring strip 128 serves to bias the card follower towards the mouth of the magazine.

An elongated locking bar 150 is mounted in the channel 112 of the side rail 53 to lie adjacent the edges of the elongated members 108 and 110. The outer edges of the members 108 and 110 may be knurled, as may the facing edge of the locking bar 150, for optimum locking engagement between the locking bar and those members. As fully described in the copending application Serial No. 823,690 referred to above, the locking bar 150 is mounted in the slot 112 for limited longitudinal movement relative to the side wall 53 of the magazine. The arrangement is such that when the locking bar 150 is moved forwardly in the slot 112, it moves laterally away from the members 108 and 110 to a disengaged position. However, when the locking bar 150 is moved back along the slot 112, it is moved laterally inwardly so that its inner end engages the facing edges of the members 108 and 110. This inward movement of the locking bar 150 is into an engaged position with respect to the card follower 101. When the locking bar is in such an engaged position, it firmly retains the card follower 100 in the position to which the card follower was established by the stack of cards in the magazine when the locking bar 150 was moved to its engaged position.

As more clearly shown in FIGURE 3, the locking bar 150 is retained in the channel 112 by means of a plurality of studs, such as the stud 154, which extend through the channel. These studs also extend through inclined slots, such as the slot 156, which are formed in the locking bar. A suitable resilient spring serves to normally bias the locking bar 150 towards the rear of the magazine. Such biasing action causes the studs 154 to engage the sides of the slots 156, so that the locking bar 150 is moved against the guide strips 108 and 110 of the follower 101 (FIGURE 7) to engage those strips and thereby to lock the card follower 101 against further movement.

As shown in FIGURE 3, an upwardly extending projection 160 is formed on the side wall 53 of the magazine, and a pawl 162 is mounted in the station 22 adjacent the path of travel of the magazine. The pawl 162 has a portion extending through a slot in the magazine to be engaged by the projection 160 as the magazine is moved into place in the station 22. The pawl 162 is mounted for limited reciprocal movement in the station 22, and it is spring biased by an appropriate biasing means (not shown) in a direction towards the rear of the station.

A further actuating pawl 164 is rotatably mounted in the station 22 adjacent the pawl 162, and this latter pawl 164 is spring biased by an appropriate spring (not shown) in a clockwise direction in FIGURE 3. The pawl 162 is positioned to engage the further pawl 164, so that when the pawl 162 is engaged by the projection 160 as the magazine 49 is moved into position in the station 22, it moves against the further pawl 164 and rotates the further pawl in a counter-clockwise direction against its spring biasing means. The further pawl 164 has an actuating arm 166 which extends through the above mentioned slot in the magazine into engagement with a shoulder 168 formed in the side of the locking bar 150.

The result is that when the magazine is moved into place in the feeding-stacking station 22, the projection 160 engages the pawl 162 and causes the pawl 162 to move against the actuating pawl 164. The pawl 164 is thereby rotated in a direction such that its actuating arm 166 causes the locking bar 150 to be moved forward toward the mouth of the magazine. This action of the locking bar serves to disengage the locking bar from the card follower 100 to permit free movement of the card follower.

Conversely, when the magazine is moved back out of the station 22, the projection 154 is disengaged from the pawl 162, so that the spring bias on the pawl 162 retracts it away from the pawl 164. This causes the pawl 164 to be rotated under its spring bias in a direction to move its actuating arm 166 away from the shoulder 168 of the locking bar. This causes the locking bar 150 to be disengaged from the arm 166, and it is spring biased back into locked engagement with the card follower 100 to arrest the free movement of the card follower.

The operation described above provides that whenever the magazine 49 is placed in the feeding-stacking station 22, its card follower 100 is freed and spring biased towards the mouth of the magazine. This permits the card follower to perform its intended function of maintaining the cards in the magazine in a stacked condition against the peripheral surface of the transport drum 14. However, when the magazine is removed from the station, and regardless of the number of cards in the magazine, the card follower immediately becomes locked against the stack of cards in the magazine to retain the cards in the magazine, and to prevent the cards from becoming unstacked when the magazine is moved back to its filing position.

The elongated member 170 referred to in conjunction with FIGURE 1, is positioned (as shown in FIGURE 3) in the station 22 adjacent the leading edge of the side wall 53 of the magazine 49, when the magazine is moved into position in the station. The member 170 has the tongue-like extremity 170a which, as described above, is precisely positioned in spaced relationship with the periphery of the drum 10. The extremity 170a, as described, defines a feed throat with the drum 14, and it permits one card at a time only to pass from the station onto the periphery of the drum.

The station 22 is illustrated in FIGURE 3 as being in its feeding mode of operation. For that mode of operation the stack head 51 is withdrawn to a stand-by position, and the feed head 50 is moved to an operative position. A vacuum pressure is established at the face 50′ of the feed head 50, and that face engages the leading card in the station 22. The vacuum pressure exerted at the periphery of the drum 14 also acts on the leading card, but the vacuum pressure exerted by the feed head 50 is greater so that the feed head holds the cards in the station. However, when the vacuum pressure at the face 50′ of the feed head 50 is interrupted, the cards pass in a one-by-one sequence through the feed throat formed by the tongue 170a of the member 170.

As shown, for example, in FIGURES 3, 4 and 5, a pair of elongated slide members 174 and 176 are positioned in slots 178 and 180 formed in the inner surfaces of the side walls 53 and 55 respectively. These slide members 174 and 176 are spring biased in a manner to be described, so that they normally extend adjacent the mouth of the magazine beyond the ends of the side walls 53 and 55 to the position illustrated in FIGURE 4. When the slide members 174 and 176 are in their extended position, their extremities extend into the plane of the ends of the finger-like elements 78, 82, 86 and 88.

The slide members 174 and 176 serve to cage the leading cards in the magazine when the magazine is withdrawn from the station 22. These cards are rigidly retained in the magazine between the bent-over extremities of the finger-like elements 78, 82, 86 and 88, and the locked card follower 100. At the same time, lateral movement of the cards is prevented by the slide members 174 and 176 in their extended position. The constructional details of the slide members 174 and 176 are described in detail in the copending application Serial No. 823,690 referred to above.

As fully described in the copending application, when the magazine 49 is moved into position in the station 22, a stop member 184, which is mounted in the station adjacent the feed head 50, engages a shoulder on the slide member 176 and forces that slide member to a retracted position into the slot 180 against the pressure of its biasing spring. However, when the slide member 176 is in its retracted position, a portion 176a of the slide member extends out from the mouth of the magazine, as shown in FIGURE 3, into a position with its extremity closely adjacent the feed head 50. This protruding portion 176a of the slide member 176 has a cammed surface which serves to shift or cam the cards in the station into appropriate position for feeding or stacking, when the magazine 49 is moved into place. The end of the slide member 174, on the other hand, engages the member 170 when the station, and the slide member 174 is also moved entirely back into its slot 178 to a retracted position when the magazine is moved into place.

As shown in FIGURE 8, a file block 200 is positioned to the rear of each of the feeding-stacking stations, such as the station 22. The file block 200 is constructed to hold a plurality of magazines, such as the illustrated magazine 49, in separate compartments positioned one over the other. The file block 200 is movable in a vertical direction, for example, transversely of the plane of the table top 10. The file block is controllable to position a selected one of the magazines in the plane of the table top, so that the selected magazine may be withdrawn from the file block and moved, for example, into position in the station 22. As mentioned above, similar file blocks can be positioned to the rear of the other feeding-stacking stations in FIGURE 1, and these also are independently controllable to enable different magazines to be positioned in the respective stations. The magazine 49, illustrated in FIGURE 2 and described above, may be considered a selected magazine from the file block 200 which has been moved into position in the feeding-stacking station 22.

The movement of the magazine 49 from the file block 200 into the station 22 is accomplished by means of a pair of discs 202 and 204 which are mounted on opposite sides of the path of the magazine 49 in the station 22. In a manner fully described in copending application Serial No. 808,824 filed April 24, 1959 in the name of Manuel A. Knefel, now U.S. Patent No. 2,968,480, the discs 202 and 204 are movable from a disengaged position displaced outwardly from the walls of the magazine to a position in which they engage the opposite side walls of the selected magazine. Appropriate rotational motions are introduced to the discs 202 and 204 to enable them to withdraw the selected magazine 49 from the file block 200 and to move the magazine into an operative position in the station along a rectilinear path under the guiding action of a channel 206 formed in the station.

Under the selective control of the discs 202 and 204, and under the control of appropriate servo mechanisms which drive the file block 200 in a vertical direction and in a horizontal direction, any selected magazine may be withdrawn from the file block 200 and moved into position into the feeding-stacking station 22. As mentioned above, the magazines in the file block 200 may each be loaded with a stack of information storage cards. Then, when a selected magazine is moved into position in the station 22, the cards in that magazine are successively fed in an end-entry manner to the transport drum 14 for processing. As also mentioned above, similar mechanisms may be incorporated at the feeding-stacking stations 24, 26, and 28 in FIGURE 1 so that other magazines may be placed in those respective stations for the end-entry successive feed of their cards to the corresponding transport drums.

At the termination of processing of the cards in the magazine 49, for example, the cards are successively returned to the magazine by conditioning the station 22 to its stacking mode, and in the manner described above. The cards are then returned to the positioned magazine. When all the cards have been so returned to the magazine, the directions of rotation of the discs 47 and 49 are reversed so that the magazine may be returned to its compartment in the file block 200.

As also explained above, one of the magazines contained in the file block 200 may be normally empty. When that magazine is selected by the discs 202 and 204 and moved into the station 22, the magazine is arrested at an intermediate position in the station and in alignment with the side-entry file 100 of FIGURE 1 and its feeding mechanism 102. A spring-loaded actuating arm 208 (see also FIGURE 8a) is pivotally mounted on the table top 10 adjacent the path of the magazine 49. This actuating arm 208 is normally spring biased in a counter-clockwise direction against a stop 210. When the magazine 49 is moved into position in the station 22, the arm 208 engages the end of the portion 176a of the slide bar 176. This engagement causes the slide bar 176 to be moved completely back into the side wall 55 of the magazine 49. This occurs when the magazine is in a position to receive the side-entry inserting mechanism 102 of the side-entry file of 101. With the slide bar 176 so retracted into the side wall 55, a group of cards selected from the side-entry file may be inserted into the forward end of the magazine 49 and against the slide bar 74. At this time, the card follower 100 described in conjunction with FIGURES 6 and 7 is locked in the manner described at the forward end of the magazine.

The above actions enable the selected group of cards from the side-entry file 100 to be firmly held between the finger-like elements 78, 82, 86 and 88 at their tops and bottoms, by the slide bar 174 at one end, and by the card follower 100 at the rear of the group.

When the selected group of cards has been so inserted into the magazine 49, the magazine is then moved forward by the discs 202 and 204 to its operative position in the station 22. Such movement causes the actuating arm 208 to be moved back against its spring bias, as shown in FIGURE 8, and this permits the arm 176 to move outwardly to its extended position to fully enclose the cards trapped in the forward end of the magazine. Then, as the magazine is moved forwardly to its operative position, the members 174 and 176 are retracted in the described manner to permit the cards to be successively fed to the transport drum 14 in the manner also described.

When the magazine 49 is returned to its midway position in the station 22 at the completion of the processing of the cards, the actuating arm 208 again becomes functional to retract the slide bar 176. This is achieved by controlling the discs 202 and 204 so that the magazine 49 is moved back into the station sufficiently to permit the end of the slide bar 176 to clear the actuating arm 208, and then to move the magazine back in the station by an amount sufficient to enable the actuating arm 208 to retract the slide bar 176. Then, and in a manner to be described, the side-entry feed mechanism serves to return the selected group of cards from the forward end of the magazine 49 to the side-entry file 100 of FIGURE 1.

As illustrated in FIGURE 9, the side-entry file 100 is mounted adjacent the station 22 and adjacent the table top 10 which supports that station. The side-entry side 100 includes a file block 250 which is movable in a vertical and in a horizontal direction, as will be explained. A pair of guide members 252 are mounted on the table top 10 adjacent the file block 250, and these guide members define a guideway through which a selected group of information storage cards from the side-entry file 100 may be moved. The guide members 252 are positioned adjacent the station 22 at an intermediate position in the station.

As illustrated in FIGURE 9, the magazine 49 is moved to the intermediate position so as to receive the selected group of cards from the side-entry file 100. The selected group is moved through the guideway 252 and into position between the finger-like elements 78, 82, 86 and 88 of the magazine 49, with the edges of the cards being moved against the slide member 174 of the magazine. In the position illustrated in FIGURE 9, the spring loaded actuating arm 208 retracts the slide bar 176 into the side wall 55 of the magazine to permit the selected group of cards to be inserted into position between the finger-like elements 78, 82, 86 and 88, and the slide bar 174. The guide member 252 is slotted appropriately at 254 to receive the actuating arm 208, when the latter is moved in a clockwise direction against its spring loading as the magazine 49 is moved forward into position in the station 22.

A pair of guide members 256 and 258 are supported in parallel relationship on a table top 260 on the opposite side of the side-entry file 250 from the table top 10. The guide members 256 and 258 are secured to the table top 260 by means, for example, of screws 262. The guide members 256 and 258 define a guideway which is in axial alignment with the guideway defined by the guide member 252. An elongated spreader member 264 (FIGURE 10) is slidable in the guideway between the guide members 256 and 258, and a push rod 266 (FIGURE 11) is slidable in the spreader 264. As will be described in more detail subsequently, the file block 250 is movable to bring a selected group of cards between the guideways formed by the guide member 252 and by the guide members 256 and 258. Then, the spreader 264 is moved forwardly into the file 250 to separate the selected group of cards from the other cards in the group. The separated cards, as described in full detail in copending application Serial No. 587,055 filed May 24, 1956, is then trapped between the forward end of the spreader 264. Then, the push rod 266 is moved to the right in FIGURE 9 to shift the selected group of cards from the spreader 264 and through the guideway formed by the guide member 252 into the forward end of the magazine 49 and against the slide bar 174.

When the above result has been accomplished, the magazine 49 may then be moved to its forward operative position in the station 22. The selected group of cards in the magazine 49 may then be sequentially fed to the transport drum 14, in the manner described in FIGURE 1. At the completion of processing, the group of cards may be returned to the station 22 in the described manner. The magazine 49 is then moved back to the position illustrated in FIGURE 9 to permit the group of cards to be returned in their proper position to the file block 250. To accomplish this, a pair of guide rails 270 and 272 are mounted on the table top 10 by means, for example, of a plurality of screws 274. The guide rails 270 and 272 are mounted in parallel relationship to define a guideway which is in axial alignment with the guideways defined by the guide members 252, and by the guide members 256 and 258. A push rod 276 (see also FIGURE 9a) is movable in the guideway formed by the guides 270 and 272. The push rod 276 has a slot 277 at its forward end to receive the slide member 174. When the push rod 276 is moved to the left in FIGURE 9, it moves the group of cards from the forward end of the magazine 49 back through the guideway formed by the guide member 252. The push rod 266 is simultaneously moved to the left in FIGURE 9, and the push rod 276 moves to the left and between the blades of the spreader 264. This permits the cards to be moved completely back into the spreader 264 which is positioned forwardly in the file block 250. Then, the push rod 276 may be returned to its illustrated position in FIGURE 9, and the spreader 264 may be returned to its illustrated position. At that time, the cards previously in the magazine 49 are returned to their original position in the file block 250 of the side-entry file 100. The magazine 49 may now be returned to the file block 200 of FIGURE 8, or the side-entry file 250 may be controlled to enable a second selected group of cards to be moved from it and positioned in the magazine 49 for subsequent processing.

Various other components of the mechanism illustrated in FIGURE 9 are described and shown in detail in the copending application Serial No. 587,055. As described in that application, the push rods 266 and 276, and the spreader 264, may be controlled by suitable cams so that these members may be moved back and forth in the manner described above.

The spreader 264 is shown in more detail in the perspective view of FIGURE 10. As shown in FIGURE 10, the spreader 264 has a pair of side walls 280 and 282 which are disposed in parallel relationship with each other. The side walls, in turn, have respective lip portions 284 and 286 which extend inwardly toward each other from the tops of the side walls. The lower edges of the side walls 280 and 282 extend outwardly from the front end of the spreader 264 to form knife portions 292 and 294. These knife portions taper inwardly at their extremities to have relatively sharp forward edges. When the spreader 264 is moved into the file block 250 as described in conjunction with FIGURE 9, the knife portions 292 and 294 extend into the stack of cards in the positioned file block to separate a selected group of cards from other cards in the file. The forward ends of the walls 280 and 282, adjacent the knife portions 292 and 294, are also brought to a sharp edge, as shown, to aid in the separation of the selected group of cards in the file.

The push rod 266 is shown in FIGURE 11 as having a substantially rectangular configuration. As previously noted, the push rod 266 slides within the spreader 264. The left end of the push rod 266 in FIGURE 11 has a pair of spaced guide flanges 296 and 298. These flanges taper outwardly as they extend from the push rod so as to have substantially a knife edge at each of their extremities. By including the guide flanges 296 and 298, the cards isolated by the spreader 264 may be embraced within these flanges of the push rod 266. The cards may then be removed from the file block 250 and carried into position in the magazine 49 by the push rod 266, as described above.

As also illustrated in FIGURES 10 and 11, the spreader 264 and the push rod 266 may have respective cam followers 300 and 302 depending from their respective lower surfaces near the rear ends of the respective members. These cam followers, in a manner fully described in the copending application Serial No. 587,055, engage suitable cam slots in associated cams so that the push rod 266 and the spreader 264 may be moved back and forth in the described manner.

The file block 250 has a plurality of shelves disposed over one another. The information storage cards are stacked along each shelf of the file block 250 in the manner shown in FIGURE 12. This figure shows a fragment of one shelf 320 of the file block by way of illustration. A plurality of information storage cards 310 are supported on the base of each shelf, such as the illustrated shelf 320. The cards are so supported in a stacked relationship, as illustrated in FIGURE 12. The cards are held in a stacked condition on the shelves, such as the shelf 320, by looped resilient springs 322, these springs being placed at both ends of the shelf. The springs 322 may be looped through several complete turns so as to become unwound as additional cards are added to the shelf. The springs 322 are advantageous in that they apply a substantially constant force to the cards to maintain the cards in a firmly stacked relationship regardless of the number of cards supported on the shelf.

The operation of the side-entry apparatus of FIGURE 9 may best be understood by reference to FIGURES 14, 15, 16 and 17. In FIGURE 14, for example, as an initial step, the side-entry file block 250 is operated in a vertical direction to bring the shelf 310 into the plane of the feed mechanism. The file block 250 is also moved horizontally to bring a section of the shelf 310 into alignment with the feed mechanism so that a selected group of cards may be fed from the side-entry file into the front of the magazine 49. Then, and as shown in FIGURE 14, the spreader 264 is moved to the right into a forward position in the file block 250. This causes the forward knife portions of the spreader (described in conjunction with FIGURE 10) to extend into the shelf 310 and to act upon the cards in the shelf for a separation of a particular group of cards from the other cards. The separated group of cards is embraced in the forward part of the spreader 264, as shown in FIGURE 14.

As a next step, the push rod 266 is moved to the right in FIGURE 14 to assume the position illustrated in FIGURE 15. During the movement of the push rod 266 from the position shown in FIGURE 14 to the position shown in FIGURE 15, the cards embraced within the spreader 264 are pushed forwardly by the push rod through the guide member 252 and into the forward end of the positioned magazine 49 against the slide member 174. Only the particular group of cards isolated in the side-entry file block 250 by the spreader 264 are moved through the guide member 252 and into the magazine 49. During the operations described above, the push rod 276 remains in its withdrawn position, as illustrated in FIGURES 14 and 15. In this withdrawn position, the push rod 276 does not interfere with the movements of the selected group of cards out of the side entry file and into the magazine 49.

After the group of cards has been advanced to its proper position in the magazine 49, the push rod 252 is retracted slightly to the left to leave the position shown in FIGURE 15 and to assume the position shown in FIGURE 16. By retracting the push rod 266 in this manner, the push rod cannot interfere with the subsequent movement of the magazine 49 to its forward position in the station 22, as illustrated, for example, in FIGURE 3.

At the termination of the processing of the group of cards in the manner described above, and after they have been returned to the magazine 49, and after the magazine has been returned to its position, as described, in which the group of cards in it may be returned to the side-entry file 250, the push rod 276 is moved to the left to leave the position shown in FIGURE 16 and to assume the position shown in FIGURE 17. After the push rod 276 reaches its forward position, as shown in FIGURE 17, the spreader 264 is returned to its withdrawn position out of the file 250. The push rod 276 is then returned to its withdrawn position, illustrated in FIGURE 14, and the original group of cards is returned to its original position in the file 250.

The invention provides, therefore, in one of its aspects an improved feeding-stacking station which is constructed to be used in conjunction with a side-entry file mechanism, and which station is capable for use in multiple station types of card processing apparatus. The invention provides in another of its aspects, an improved feeding-stacking station for use in such card processing apparatus and which may be used in conjunction with both side-entry and end-entry file mechanisms.

The invention is advantageous in that it permits an extremely large number of cards to be stored in readiness for processing by the card processing apparatus; and yet permits any particular card, or group of cards, to be reached and processed at a relatively short access time.

The apparatus described above has certain important advantages. It is able to select a magazine from a plurality of such magazines in the end-entry file and to insert such selected magazine into a station. The cards introduced into the station from the magazine may then be transferred from the station to the transport means such as drums so that information on the cards may be processed as the cards are transported. The cards may then be returned to the station and subsequently returned by the magazine to the end-entry file.

At certain times, the magazine inserted into the station from the end-entry file may be empty. At such times, the magazine may become positioned to receive cards from a side-entry file. These cards may comprise a small group of cards selected from a large plurality of cards in the side-entry file. After the cards from the side-entry file have become inserted into the magazine, the magazine becomes moved in a direction to produce a coupled relationship between the cards in the magazine and the transport means such as the drum. The cards then become transferred to the transport means for processing and are subsequently returned to the magazine after being processed. The cards in the magazine can then be returned to the side-entry file and the empty magazine can be subsequently returned to the end-entry file. As an alternative, the magazine can be returned to the end-entry file with the cards in the magazine.

The apparatus described above has certain additional advantages. While the cards in one station are being processed, a side-entry file or an end-entry file may be moved into coupled relationship with a second station and cards may be transferred into the second station. Because of this, the cards in the second station may become transferred to the transport means for processing immediately after the processing of the cards from the first station has been completed. This causes the cards to be processed on a time-sharing basis and without any dead time between the processing of different groups of cards.

Another advantage of this invention is that the group of cards selected from the large plurality of cards in the side-entry file can be inserted into a station for storage in the station. Because of this, the apparatus constituting this invention provides an enhanced flexibility in operation. This flexibility in operation is further enhanced by the inclusion of both end-entry files and side-entry files in the apparatus constituting this invention.

It should be appreciated that the cards returned to a magazine do not necessarily have to be the same cards as those previously obtained from the magazine. For example, other cards may be introduced to the magazine during the processing operation in addition to those previously obtained from the magazine. Furthermore, some of the cards originally obtained from the magazine do not necessarily have to be returned to the magazine after they have been processed.

I claim:

1. In apparatus for processing data on a plurality of information storage elements wherein the elements in the plurality may be included in a group and as other elements in addition to the group, the combination of: a magazine constructed to hold the elements in the plurality in stacked relationship, locking means operatively coupled to the cards in the magazine for locking the cards in the magazine to prevent a transfer of cards in the plurality into and out of the magazine, a file constructed to hold the elements in the plurality in stacked relationship, means operatively coupled to the locking means for modifying the operation of the locking means to obtain the transfer of a group of elements between the file and the magazine and to retain the other elements in the magazine in locked relationship within the magazine, and means movable between the file and the magazine to obtain a transfer of the group of elements in the plurality between the magazine and the file upon the modification in the operation of the locking means.

2. In apparatus for processing data on a plurality of information storage elements wherein the elements in the plurality may be included as a group and as other elements in addition to the group, the combination of: a magazine constructed to hold the elements in the plurality in stacked relationship, the magazine being constructed to obtain a transfer of elements in the plurality into and out of the magazine through the side of the magazine, first locking means operatively coupled to the elements in the magazine for locking the elements in the magazine against lateral movements in the magazine, second locking means operatively coupled to the elements in the magazine for locking the elements in the magazine against longitudinal movements in the magazine, a file constructed to hold the elements in the plurality in stacked relationship and disposed relative to the magazine to obtain a transfer of elements in the plurality between the magazine and the file through the side of the magazine, means operatively coupled to the first locking means for modifying the operation of the first locking means to provide for a transfer of the group of elements in the plurality between the magazine and the file and to obtain a retention of the other elements in the plurality in the magazine by the first and second locking means, and means movable between the file and the magazine for obtaining a transfer of elements in the plurality between the file and the magazine upon the modification in the operation of the first locking means.

3. In apparatus for processing data on a plurality of information storage elements, the combination of: a magazine constructed to hold the elements in the plurality in stacked relationship, the magazine being constructed to obtain a transfer of elements in the plurality into and out of the magazine through a particular side of the magazine, first locking means including first and second members disposed at the opposite lateral extremities of the elements in the magazine to lock the elements against lateral movements in the magazine, the first member being disposed adjacent the particular side in the magazine to lock the elements in the magazine against movement through the particular side of the magazine and being movable to a displaced position for providing for a transfer of elements through the particular side, second locking means including a pusher member biased against the elements in the magazine to lock such elements against longitudinal movements in the magazine, a file constructed to hold the elements in the plurality in stacked relationship and disposed relative to the magazine to provide for a transfer of elements in the plurality between the file and the magazine through the particular side of the magazine, means operatively coupled to the first member in the first locking means for obtaining a movement of the first member to the displaced position to provide for a transfer of elements in the plurality between the file and the magazine through the particular side of the magazine, and means movable between the magazine and the file for obtaining a transfer of elements in the plurality between the magazine and the file through the particular side of the magazine upon the movement of the first member in the first locking means to the displaced position.

4. In apparatus for processing data on a plurality of information storage elements wherein the elements may be included as a group and as other elements in addition to the group, the combination of: a magazine constructed to hold the elements in the plurality in stacked relationship, transport means for the cards, the magazine being movable relative to the transport means to first and second particular positions, means disposed relative to the magazine and to the transport means in the first particular position of the magazine relative to the transport means to obtain an individual transfer of elements in sequence between the magazine and the transport means, locking means operatively coupled to the elements in the magazine to prevent a transfer from the magazine of the elements in the magazine in the positions of the magazine other than the first particular position, a file structure constructed to hold the elements in the plurality in sacked relationship and disposed relative to the magazine in the second particular position of the magazine to obtain a transfer of a group of elements in the plurality between the file structure and the magazine, means operatively coupled to the locking means in the second particular position of the magazine relative to the transport means to modify the operation of the locking means for the transfer of a group of elements in the plurality between the magazine and the file structure and for the retention of the other elements in the plurality in the magazine, and means movable between the magazine and the file structure in the second particular position of the file structure for obtaining the transfer of the group of elements in the plurality between the magazine and the file structure.

5. In apparatus for processing data on a plurality of information storage elements wherein the elements in the plurality may be included as a group and as other elements in addition to the group, the combination of: transport means for the information storage elements, a magazine constructed to hold the elements in the plurality in stacked relationship and movable into a first particular position relative to the transport means to obtain a transfer of elements in the plurality between the magazine and the transport means, locking means disposed within the magazine during the movement of the magazine to the first particular position for locking the elements in the magazine to prevent any movement of the elements in the magazine, means operatively coupled to the elements in the magazine upon the movement of the magazine to the first particular position for operating upon the locking means to provide for an individual transfer of elements in the plurality between the magazine and the transport means, means operatively coupled to the elements in the plurality in the first particular position of the magazine for obtaining an individual transfer of such elements between the transport means and the magazine, a file constructed to hold the elements in the plurality in stacked relationship, means operatively coupled to the locking means in a second particular position of the magazine different from the first particular position for providing for a transfer of the group of elements in the plurality between the file and the magazine and for retaining a locked relationship of the other elements in the plurality in the magazine by the locking means, and means operative in the second particular position of the magazine for obtaining a transfer of the selected group of the elements between the file and the magazine.

6. In apparatus for processing data on a plurality of information storage elements wherein the elements in the plurality may be included as a group and as other elements in addition to the group, the combination of: transport means for the elements in the plurality, a magazine constructed to hold the elements in the plurality in stacked relationship, the magazine being constructed to obtain a transfer of elements in the plurality into and out of the magazine through a particular side of the magazine, the magazine being movable to first and second positions relative to the transport means, first locking means operatively coupled to the elements in the magazine for locking the elements in the magazine against lateral movements of the elements in the magazine, second locking means operatively coupled to the elements in the magazine for locking the elements in the magazine against longitudinal movements of the elements in the magazine, means responsive to the movement of the magazine to the first position relative to the transport means to release the first and second locking means for the individual transfer of elements in the plurality between the magazine and the transport means, means disposed relative to the magazine and the transport means in the first position of the magazine relative to the transport means to obtain an individual transfer of elements in the plurality between the magazine and the transport means, a file constructed to hold the elements in the plurality in stacked relationship and disposed relative to the magazine to obtain a transfer of elements in the plurality between the magazine and the file through the side of the magazine, means operatively coupled to the first locking means in the second position of the magazine relative to the transport means for modifying the operation of the first locking means to provide for a transfer of the group of elements in the plurality between the magazine and the file and to obtain a retention of the other elements in the plurality in the magazine by the first and second locking means, and means movable between the file and the magazine for obtaining a transfer of elements in the plurality between the file and the magazine upon the modification in the operation of the first locking means.

7. In apparatus for processing data on a plurality of information storage elements, the combination of: transport means for the elements in the plurality, the magazine being movable to first and second positions relative to the transport means, a magazine constructed to hold the elements in the plurality in stacked relationship, the magazine being constructed to obtain a transfer of elements in the plurality into and out of the magazine through a particular side of the magazine, first locking means including first and second members disposed at the opposite lateral extremities of the elements in the magazine to lock the elements in the magazine against lateral movements in the magazine, the first member being disposed relative to the particular side in the magazine to lock the elements in the magazine against movement through the particular side in the magazine and being movable to a displaced position for providing for an individual transfer of elements through the particular side in the magazine, second locking means disposed in the magazine to lock the elements in the magazine against longitudinal movements in the magazine, a file constructed to hold the elements in the plurality in stacked relationship and disposed relative to the particular side of the magazine in the second position of the magazine to provide for a transfer of elements in the plurality between the file and the magazine through the particular side of the magazine, means responsive to the movement of the magazine to the first position relative to the transport means for operating upon the first and second locking means to provide for an individual transfer of elements in the plurality between the magazine and the transport means, means disposed relative to the magazine and the transport means in the first position of the magazine for obtaining a transfer of elements in the plurality between the magazine and the transport means, means responsive to the movement of the magazine to the second position relative to the transport means for obtaining a movement of the first member in the first locking means to the displaced position, and means responsive to the movement of the first member in the first locking means to the displaced position for obtaining a transfer of elements in the plurality between the magazine and the file through the particular side of the magazine.

8. In apparatus for processing data on a plurality of information storage elements, the combination of: transport means for the information storage elements, means including at least one end-entry station positioned relative to the transport means to obtain an individual transfer of elements between the transport means and the station and operable to obtain a transfer of the storage elements in the plurality between the end-entry station and the transport means through the end of the station, and side-entry file means for the storage elements and positioned relative to the station and movable laterally relative to the side of the station at a position displaced from the end of the station and constructed to obtain a transfer of a selected group of the storage elements in the plurality from the side-entry file means to the station in one operative relationship for a transfer of such elements through the mouth of the station and to obtain a transfer of the selected group of elements from the station to the side-entry file means in a second operative relationship.

9. In apparatus for processing data on a plurality of information storage elements, the combination of: transport means for the information storage elements, at least one end-entry station positioned relative to the transport means and constructed to obtain a transfer of elements between the station and the transport means through the end of the station, transfer means disposed relative to the station and constructed to obtain a sequential transfer of the storage elements between the station and the transport means, side-entry file means for the information storage elements and supported in lateral relationship with the station to obtain a transfer of elements between the station and the side-entry file means, and further transfer means operatively coupled to the side-entry file means and laterally movable relative to the side-entry file means and the station for obtaining a controlled transfer of selected groups of the storage elements in the plurality from the side-entry file means to the station in one operative relationship and for obtaining a controlled transfer of selected groups of the storage elements in the plurality from the station to the side-entry file means in a second operative relationship.

10. In apparatus for processing data on a plurality of information storage elements, the combination of: transport means for the information storage elements, end-entry retaining means for the information storage elements, the end-entry retaining means being constructed to obtain an individual transfer of elements in the plurality into and out of the retaining means through the end of the retaining means and through the side of the retaining means, transfer means operatively coupled to the end-entry retaining means and the transport means for obtaining an individual transfer of elements between the transport means and the end-entry retaining means through the end of the end-entry retaining means, means for supporting the end-entry retaining means in a position relative to the transfer means to obtain an individual transfer of the storage elements between the end-entry retaining means and the transport means through the end of the retaining means, side-entry file means for the information storage elements in the plurality and supported in lateral relationship to the end-entry retaining means to obtain a transfer of elements between the side-entry file means and the retaining means through the side of the retaining means, and transfer means operatively coupled to the side-entry file means and movable laterally between the file means and the retaining means for obtaining a controlled transfer of a selected group of the storage elements in the plurality from the side-entry file means to the end-entry retaining means in one operative relationship and to obtain a transfer of the selected groups of the storage elements in the plurality from the retaining means to the file means in a second operative relationship.

11. In apparatus for processing data on a plurality of information storage elements, the combination of: transport means for the information storage elements, end-entry magazine means for the information storage elements, means for supporting the end-entry magazine means in a position relative to the transport means to obtain an individual transfer of elements between the magazine means and the transport means through the end of the magazine means, means operatively coupled to the magazine means for moving the magazine means longitudinally along the supporting means into a first particular relationship with the transport means to obtain a transfer of the information storage elements between the magazine means and the transport means, first means operative upon the elements in the plurality in the first particular position of the magazine means for obtaining a controlled and individual transfer of such elements between the magazine means and the transport means, side-entry file means for the information storage elements and supported laterally relative to the longitudinal path of the magazine means along the supporting means to obtain a transfer of a group of elements in the plurality between the magazine means and the side-entry file means at a second particular position of the magazine means relative to the transport means, and second transfer means operatively coupled to the side-entry file means and to the magazine means in the second particular position of the magazine means relative to the transport means for obtaining a controlled transfer of the group of storage elements in the plurality between the side-entry file means and the magazine means.

12. The combination defined in claim 9 in which the side-entry file means is movable relative to the magazine means to control the selection of the groups of the storage elements in the plurality by said second transfer means for transfer from the side-entry file means to the magazine means.

13. In apparatus for processing data on a plurality of information storage elements, the combination of: transport means for the information storage elements, end-entry file means for supporting the information storage elements in the plurality in a stacked relationship in a position relative to the transport means for the sequential transfer of the storage elements from the end-entry file means to the transport means through the end of the file means and for the sequential transfer of storage elements from the transport means to the end-entry file means through the end of the file means, the end-entry file means being constructed to receive elements in the plurality through the side of the file means, means operatively coupled to the elements on the transport means in a first operating mode for obtaining a sequential transfer of elements in the plurality from the end-entry file means to the transport means through the end of the file means and operatively coupled to the elements in the end-entry file means in a second operating mode for obtaining a sequential transfer of elements in the plurality from the transport means to the end-entry file means through the end of the end-entry file means in a second operating mode, side-entry file means constructed to hold the storage elements in the plurality in a stacked relationship at a lateral position relative to the end-entry means, and means operative upon the storage elements in the plurality in a first mode for selecting an individual group of such storage elements and for inserting the storage elements in the selected group into the end-entry file means through the side of the file means for subsequent transfer of the storage elements from the end-entry file means to the transport means through the end of the file means and operative upon the storage elements in the plurality in a second mode for selecting an individual group of such storage elements and for inserting the storage elements in the selected group into the side-entry file means from the end-entry file means through the side of the end-entry file means.

14. In apparatus for processing data on a plurality of information storage elements, the combination of: means including a rotatable vacuum pressure transport drum constructed to obtain a movement of the information storage elements in the plurality with the drum, end-entry magazine means constructed to support the information storage elements in the plurality in a stacked relationship and disposed relative to the vacuum pressure transport drum to obtain a sequential transfer of storage elements in the plurality from the end-entry magazine means to the transport drum through the end of the magazine means in one operating mode and to obtain a sequential transfer of storage elements in the plurality from the transport drum to the magazine means through the end of the magazine means in a second operating mode, the magazine means being constructed to obtain a transfer of elements into and out of the magazine means through the side of the magazine means, side-entry file means constructed to retain the storage elements in the plurality in a stacked relationship and disposed relative to the end-entry magazine means to obtain a transfer of elements in the plurality between the side-entry file means and the magazine means through the side of the magazine means, means operative upon the storage elements in the plurality in the side-entry file means for selecting an individual group of such storage elements and for inserting the storage elements in the selected group into the end-entry magazine means through the side of the magazine means for the subsequent transfer of the storage elements in the selected group from the end-entry magazine means to the transport drum through the end of the magazine means, and means operative upon the elements in the plurality for obtaining a transfer of such elements between the drum and the end-entry magazine means through the end of the magazine means.

15. In apparatus for processing data on a plurality of information storage cards, the combination of: transport means for the information storage cards, end-entry magazine means constructed to support the information storage cards in a stacked relationship and to obtain a transfer of cards between the transport means and the magazine means through the end of the magazine means, means operative upon the end-entry magazine means for moving the magazine means between a first position displaced from the transport means and a second position relative to the transport means for the sequential transfer of cards in the plurality between the end-entry magazine means and the transport means through the end of the transport means only in the second position of the magazine means, the magazine means being constructed to obtain a transfer of cards into and out of the magazine means through the side of the magazine means, means operatively coupled to the cards on the transport means in a first operative relationship for obtaining a transfer of such cards from the transport means to the magazine means through the end of the magazine means in the second position of the magazine means and operatively coupled to the cards in the magazine means in a second operative relationship for obtaining a transfer of cards from the magazine means to the transport means through the end of the magazine means in the second position of the magazine means, side-entry file means constructed to hold the storage cards in the plurality in a stacked relationship and disposed laterally relative to the end-entry magazine means in the first position of the end-entry magazine means to obtain a transfer of cards between the magazine means and the file means through the side of the magazine means, and means operative upon the storage cards in the side-entry file means for selecting an individual group of such storage cards and for moving the storage cards in the selected group laterally into the end-entry magazine means through the side of the magazine means in the first position of the end-entry magazine means for the subsequent transfer of the storage cards to the transport means from the end-entry magazine means through the end of the magazine means in the second position of the end-entry magazine means.

16. In apparatus for processing data on a plurality of information storage cards, the combination of: transport means for the information storage cards, a magazine constructed to hold the information storage cards in a stacked relationship, means for supporting the magazine, means operative upon the magazine for moving the magazine on the supporting means between a first position displaced from the transport means and a second position adjacent the transport means for the sequential transfer of the cards from the magazine to the transport means through the end of the magazine only in the second position of the magazine, the magazine being constructed to obtain a transfer of cards into and out of the magazine through the side of the magazine, means operatively coupled to the cards in the plurality for obtaining a transfer of such cards between the magazine and the transport means through the end of the magazine in the second position of the magazine on the supporting means, file means constructed to hold the storage cards in the plurality in a stacked relationship and disposed laterally relative to the magazine in the first position of the magazine to obtain a transfer of cards between the file means and the magazine through the side of the magazine, and means operative upon the storage cards in the file means for selecting an individual group of such storage cards and for moving the storage cards in the selected group laterally into the magazine through the side of the magazine in the first position of the magazine for the subsequent transfer of the cards from the magazine to the transport means through the end of the magazine in the second position of the magazine.

17. In apparatus for processing data on a plurality of information storage elements, the combination of: transport means for the information storage elements, a magazine constructed to hold the information storage elements in a stacked relationship and having a mouth for the sequential transfer of the information storage elements through the mouth, supporting means for holding the magazine in position with the mouth disposed relative to the transport means to obtain a transfer of storage elements in the plurality in sequence through the mouth of the magazine between the transport means and the magazine, the magazine being constructed to obtain a movement of elements into and out of the magazine through the side of the magazine, means operatively coupled to the elements in the plurality for obtaining a transfer of such elements between the magazine and the transport means through the mouth of the magazine, a file structure constructed to hold the information storage elements in a stacked relationship and disposed laterally relative to the magazine to obtain a transfer of elements in the plurality between the magazine and the file structure through the side of the magazine, and means operative upon an individual group of the storage elements in the plurality for selecting such individual group of elements and for moving the storage elements in the selected group laterally between the magazine and the file structure for insertion into the magazine through the side of the magazine upon movement laterally in a first direction and for insertion into the file structure through the side of the magazine upon movement laterally in a second direction opposite to the first direction.

18. In apparatus for processing data on a plurality of information storage cards, the combination of: means including a vacuum pressure rotatable transport drum constructed to obtain a movement of the information storage cards in the plurality with the drum, a magazine constructed to hold the information storage cards in a stacked relationship and having a mouth through which the information storage cards are sequentially transferred, supporting means for holding the magazine with the mouth disposed relative to the transport drum to obtain a transfer of the storage cards in the plurality in sequence through the mouth between the magazine and the transport drum, the magazine being constructed to obtain a movement of cards in the plurality into and out of the magazine through the side of the magazine, a file structure constructed to hold the information storage cards in a stacked relationship and disposed relative to the magazine to obtain a transfer of cards between the magazine and the file structure through the side of the magazine, means operative upon the storage cards in the plurality for selecting an individual group of such cards and for moving the storage cards in the selected group into the magazine through the side of the magazine from the file structure in one operative relationship and for moving the cards in the selected group into the file structure from the magazine through the side of the magazine in a second operative relationship, and means operatively coupled to the cards in the plurality, including the cards transferred to the magazine from the file structure, for obtaining a transfer of such cards between the magazine and the transport means.

19. In apparatus for processing data on a plurality of information storage cards, the combination of: transport means for the information storage cards, magazine means constructed to hold the information storage cards in a stacked relationship and having a mouth through which the information storage cards are sequentially transferred, supporting means for the magazine, the magazine being movable on the supporting means between a first position displaced from the transport means and a second position in which the mouth of the magazine is adjacent the transport means to obtain a transfer of the storage cards in the magazine in sequence from the magazine to the transport means, means operatively coupled to the cards in the plurality for obtaining a transfer of such cards between the magazine means and the transport means in the second position of the magazine means, a file structure constructed to hold the information storage cards in the plurality in a stacked relationship and disposed adjacent the supporting means at the first position of the magazine, and means operative upon the storage cards in the file structure for selecting an individual group of such cards and for inserting the storage cards in the selected group into the magazine.

References Cited in the file of this patent

UNITED STATES PATENTS

| | | |
|---|---|---|
| 1,584,789 | Megathlin | May 18, 1926 |
| 2,590,222 | Van Veen | Mar. 25, 1952 |
| 2,630,956 | Pomeroy et al. | Mar. 10, 1953 |
| 2,795,328 | Tyler et al. | June 11, 1957 |
| 2,814,440 | McWhirter et al. | Nov. 26, 1957 |
| 2,896,946 | Barratt et al. | July 29, 1959 |